United States Patent
Merrien et al.

(10) Patent No.: US 7,925,878 B2
(45) Date of Patent: Apr. 12, 2011

(54) SYSTEM AND METHOD FOR CREATING A TRUSTED NETWORK CAPABLE OF FACILITATING SECURE OPEN NETWORK TRANSACTIONS USING BATCH CREDENTIALS

(75) Inventors: Lionel Merrien, Montreal (CA); Jean-Louis Carrara, Dallas, TX (US); Youri Bebic, Dallas, TX (US); Paul Miller, Cumberland, RI (US)

(73) Assignee: Gemalto SA, Meudon (FR)

( * ) Notice: Subject to any disclaimer, the term of this patent is extended or adjusted under 35 U.S.C. 154(b) by 2292 days.

(21) Appl. No.: 10/252,517

(22) Filed: Sep. 24, 2002

(65) Prior Publication Data
US 2003/0084311 A1 May 1, 2003

Related U.S. Application Data

(60) Provisional application No. 60/326,527, filed on Oct. 3, 2001.

(51) Int. Cl.
*H04L 29/06* (2006.01)
*H04L 9/32* (2006.01)
*G06F 11/30* (2006.01)
*G06F 15/16* (2006.01)

(52) U.S. Cl. ........ 713/155; 713/173; 713/175; 713/191; 709/223; 709/229; 455/3.01

(58) Field of Classification Search ............... 713/155, 713/185, 191, 157, 173, 175; 726/9; 709/223, 709/229; 455/3.01
See application file for complete search history.

(56) References Cited

U.S. PATENT DOCUMENTS

| 5,402,490 | A | * | 3/1995 | Mihm, Jr. | 380/247 |
| 5,495,411 | A | * | 2/1996 | Ananda | 705/32 |
| 5,687,094 | A | * | 11/1997 | Kagawa et al. | 716/5 |
| 6,192,130 | B1 | * | 2/2001 | Otway | 380/277 |
| 6,199,161 | B1 | * | 3/2001 | Ahvenainen | 713/155 |
| 6,209,091 | B1 | * | 3/2001 | Sudia et al. | 713/175 |
| 6,298,336 | B1 | * | 10/2001 | Davis et al. | 705/41 |
| 6,367,011 | B1 | * | 4/2002 | Lee et al. | 713/172 |
| 6,463,534 | B1 | * | 10/2002 | Geiger et al. | 713/168 |
| 6,671,803 | B1 | * | 12/2003 | Pasieka | 713/156 |
| 6,748,530 | B1 | * | 6/2004 | Aoki | 713/156 |
| 6,748,531 | B1 | * | 6/2004 | Epstein | 713/158 |
| 6,754,829 | B1 | * | 6/2004 | Butt et al. | 726/8 |
| 6,880,084 | B1 | * | 4/2005 | Brittenham et al. | 713/173 |
| 6,983,368 | B2 | * | 1/2006 | Wheeler et al. | 713/170 |
| 2002/0144117 | A1 | * | 10/2002 | Faigle | 713/169 |
| 2002/0144149 | A1 | * | 10/2002 | Hanna et al. | 713/201 |
| 2002/0176583 | A1 | * | 11/2002 | Buttiker | 380/282 |
| 2003/0014629 | A1 | * | 1/2003 | Zuccherato | 713/156 |

(Continued)

*Primary Examiner* — William R Korzuch
*Assistant Examiner* — Trang Doan
(74) *Attorney, Agent, or Firm* — Buchanan, Ingersoll & Rooney PC

(57) ABSTRACT

A system and method for creating a trusted network capable of facilitating secure transactions via an open network using batch credentials, such as batch PKI certificates, is presented. A certificate is bound to a group, or batch, or devices. This certificate is referenced by an activation authority upon processing a request for service by a device. Information regarding the device batch certificate is maintained in a permanent, or escrow, database. A user identity is bound to a device, as a device key is used to sign a user key created on the device in the presence of the user, and a copy of the device key is later used to decrypt the signed user key upon its transmission and receipt.

35 Claims, 20 Drawing Sheets

U.S. PATENT DOCUMENTS

| | | | |
|---|---|---|---|
| 2003/0028770 A1* | 2/2003 | Litwin et al. | 713/171 |
| 2003/0028811 A1* | 2/2003 | Walker et al. | 713/202 |
| 2003/0070080 A1* | 4/2003 | Rosen | 713/187 |
| 2003/0163685 A1* | 8/2003 | Paatero | 713/155 |

* cited by examiner

SYSTEM AND METHOD FOR CREATING A TRUSTED NETWORK CAPABLE OF FACILITATING SECURE OPEN NETWORK TRANSACTIONS USING BATCH CREDENTIALS

This application claims priority under 35 U.S.C. §119 to U.S. Provisional Application No. 60/326,527 entitled SYSTEM AND METHOD FOR CREATING A TRUSTED NETWORK CAPABLE OF FACILITATING SECURE OPEN NETWORK TRANSACTIONS USING BATCH CREDENTIALS and filed on Oct. 3, 2001, the entire content of which is hereby incorporated by reference.

FIELD OF THE INVENTION

The present invention relates generally to trusted authentication and secure transactions on a communications network by way of a credential, such as a PKI certificate. More specifically, the present invention relates to the use of certificates, or other notorization, for batches of devices for authenticating and validating devices employed in commerce over a communications network.

BACKGROUND OF THE INVENTION

With the advent of the Internet, the number of on-line transactions has increased dramatically. With this increase, concerns for the security of transactions, the authentication of the parties to the transaction, the non-repudiation of the transaction, and the authentication and validation of devices used in such transactions have also risen. In response to these concerns, a public key infrastructure (PKI) was developed in which digital certificates and a related cryptographic key pair are issued by certificate authorities (CAs) to individuals and institutions involved in electronic commerce (e-cornmerce) by way of open networks such as the Internet. These certificates serve the purpose of authenticating the identity of both parties to a transaction, providing for the non-repudiation of the transaction, and are associated with key pairs by which encryption of transactions carried out over the Internet can be performed. The evolution of PKI infrastructure-type transactions has developed dramatically over the past few years.

The first stage of PKI used certificates bound to the identity of individuals. In this first stage, the user was required to request and download a certificate, which could then be used in conjunction with its related cryptographic key pair for secure authenticated Internet transactions. Each user would pay for his own cryptographic key pair and certificate. This first stage of PKI infrastructure provided direct personal identification of people involved in Internet transactions. In addition, the cost associated with obtaining a single certificate is relatively low.

The second stage of the PKI evolution allowed for institutions to request certificates on behalf of people about whom they had some special knowledge. For example, a bank or other similar organization could request a PKI certificate on behalf of one of its customers or members. This certificate would be bound to the identification information of the person on whose behalf the certificate was requested, and the identification information would be provided by the requesting organization. A certificate and an associated cryptographic key pair would then be issued on behalf of the person to the organization requesting the certificate, and the certificate would be issued to a user, possibly in the form of a token. Examples of tokens which can store certificate information include, smart cards, smart keys, and other hardware devices capable of storing the private key and digital certificate (or reference to a digital certificate) in memory. The cost of the certificate, initially paid by the requesting organization, could be recovered as a user would pay for services or devices (e.g., the tokens whereon the certificate and cryptographic key pair was stored) from the requesting organization.

Thus, in the second stage of the PKI evolution, the process of obtaining a certificate was transparent to a user, as the user was not required to request and/or download a certificate. Therefore, the second stage of PKI evolution was easier to use than the first stage, and received less resistence from customers.

The third stage of the PKI evolution represented a fundamental shift in the manner in which digital certificates were issued. In the first two stages, a digital certificate was bound to a specific person's identification. In the third stage, however, the digital certificate was bound to a device identification number. In the third stage of the PKI evolution, a manufacturer of devices to be used in Internet commerce requests certificates for each device which it has manufactured. The manufacturer then maintains records regarding each device, and its status, so that when the certificate corresponding to that device is used, one can authenticate the device, verify that the device was operating properly, and verify that its certificate has not been revoked. The device, by way of its certificate, is able to open a secure communication link, whereby the device can communicate securely with other devices on the network to which it is connected.

One example in which the third stage of the PKI evolution may be utilized is in the realm of mobile telephony. Specifically, for example, the third stage may be used in the global system for mobile communications (GSM), wherein each phone operating on the network contains a subscriber identity module card, which is commonly referred to as a SIM card or smart card. The SIM card may contain information regarding the user account of the user to whom the SIM card has been assigned. A user can then remove his or her SIM card, and insert it in a new phone, which will immediately begin to function according to the user identification and preferences retained in memory within the SIM card. In this model, the service provider, or telephone service carrier, is the organization that requests a certificate for each device, which in this case is stored within each SIM card. By way of the SIM card, users of global telephones within the GSM system may readily perform secure transactions over a wireless network, such as a network using the wireless application protocol (WAP), for example, by using a cryptographic key pair which may be associated with and/or stored in the SIM card.

The third stage of the PKI evolution has found success in numerous environments in which smart cards are utilized. As mentioned above, smart cards are used in the GSM system worldwide. However, smart cards are also useful in banking, and other commercial environments. Smart cards are a logical choice for the device to which a certificate may be bound as they are trusted among a variety of different environments, such as wireless networks and payment networks, and are trusted within many digital signature laws. Additionally, smart cards are a logical choice as they have been academically and field tested for security. Smart cards usually require a two-factor authentication process, which involves both something that the user knows and something that the user possesses. Usually, in the smart card environment, the user possesses the card, and knows a personal identification (PIN) or some type of password. The third stage of the PKI evolution presented the user with a familiar business model, much like receiving an automated teller machine (ATM) card, credit card, or the like.

Various problems exist with all three of the previous stages of the PKI evolution mentioned above, however. First, using certificates to identify each device on a communications network, as in the third stage where devices are mass produced, is costly. This is because the PKI was developed with the model of the first stage in mind, where each person retained a digital certificate, paid for the certificate himself, and often required no more than one. However, with certificates being assigned to devices, there are separate certificates for each device used. Thus, a person may require a large number of devices, over the course of his or her lifetime, each of which may require a digital certificate for secure transactions over a communication network. Therefore, the expense for many such devices can become too high, and would stymie the flow of Internet commerce requiring digital certificates. Also, if this certificate is paid for by the device manufacturer, the number of devices manufactured, and therefore the cost of providing a certificate for each device, may be staggering.

A second problem regarding the third stage of the PKI evolution is that the identity of a user, and the key pair related to the user's identity, must be added to the device after the device is manufactured. This presents security and authentication concerns, as an illegitimate user could potentially add his or her fraudulent key pair to the device after manufacture, and thereby defraud the network while using a trusted device.

Third, because the network over which devices are generally used is open, the device must be certified (or trusted) to allow secure communication over the open network. This is an important consideration as no secure services could be added via a communication link over an open network without two trusted endpoints. Thus, both the server and the device must be certified (or trusted). Some such desired secure services may include, for example, distributing encryption keys, adding user identities, and/or delivering private data, such as user preferences or profiling information.

Accordingly, it is desirable to develop a system using a PKI infrastructure that is capable of solving each of the aforementioned problems. Specifically, it would be desirable to develop a PKI system that is capable of minimizing the cost of certificates issued to devices and increasing security associated with generating a key pair of a user (i.e., a "user key pair") associated with the device, and providing a technique whereby user preference and profile information may be quickly and readily transmitted.

SUMMARY OF THE INVENTION

The present invention provides solutions to the aforementioned problems. Specifically, the present invention reduces the overall cost associated with assigning certificates to devices, provides a manner whereby key pairs of users associated with the device certificates may be added in a secure manner that may be readily authenticated and nonrepudiated, and provides a technique whereby user preference and profile information may be readily stored and transmitted or received via the communication network after mutual authentication of the server and device.

In accordance with an embodiment of the present invention, a single credential, such as a digital certificate (e.g., a PKI certificate, notarization, etc.), may be associated with all device identifiers for a group or batch of devices. Thus, the cost associated with providing certificates for a large number of devices may be greatly reduced. A manifest, or list of devices at the time of creation, is stored in an escrow database, and forms a permanent list that is not altered, providing a permanent record of all devices initially bound to a certification. Additionally, a current list of devices approved for use with the assigned certificate is maintained, and a list of devices that are no longer functioning, have had their device key compromised or should otherwise not be trusted (e.g., a revocation list or a "hot list") is also maintained in accordance with an embodiment of the present invention.

The device key pairs associated with each device are matched to device identifiers, such as device identification numbers. The private key of these key pairs may, in accordance with an embodiment of the present invention, be maintained exclusively within the hardware of the smart card. By maintaining the private device key exclusively within hardware, the likelihood of the private key being copied is greatly reduced. Thus, the overall security of systems using devices that maintain copies of their private keys exclusively within hardware is much better than systems where private keys are stored within software.

Additionally, in accordance with an embodiment of the present invention, added security may be obtained by using each device for generating a user key pair associated with the user of the device. In such an embodiment, a user that has received a device, such as a smart card, having an associated device private key stored within the device's hardware, may be present while a relatively secure user key pair is generated in the device, which is in conformance with various digital signature laws internationally. The user public key may then be signed using the device private key, and transmitted to and decrypted by authorized personnel receiving the signed user public key over the network using the device public key. The fact that the user key is signed by the device key establishes that the device generated the user key pair.

Thus, third parties may readily verify that the user key pair is stored in the hardware of a particular device, and that the user was present at the time the user key pair was generated. According to the present invention, devices used in Internet transactions may be verified against the batch certificate, assigned to the batch from which the device originates. Revocation and/or hot lists may be consulted to determine that the device is still in operation and is still a trusted device authorized to transmit data over an open network, such as the Internet or GSM mobile telephone network. Furthermore, in accordance with an embodiment of the present invention, user profile and preference information may be stored remotely and accessed by a pointer stored within the device. This information may be stored in a "cookie" file, for example, at a location remote from the device within the network, and referenced by a pointer. Advantageously, storing this profile and preference information remotely avoids overburdening the memory and bandwidth constraints of the device.

Further features and advantages of the invention are explained in greater detail hereinafter with reference to specific embodiments which are illustrated in the accompanying drawings, wherein like reference numerals are used to identify like elements.

DETAILED DESCRIPTION

To facilitate an understanding of the principles and features of the present invention, it is explained hereinafter with reference to its implementation in an illustrative embodiment. In particular, the invention is described in the context of smart card devices, wherein cards are each assigned a different key pair. The smart cards are grouped in manufacturing batches, each batch having a single credential (e.g., a digital certificate associated therewith. One specific embodiment of such a system is described in the context of using SIM cards in connection with the GSM telephone communications system. Additionally, the present invention is described in connection with the PKI system, which allows an encryption and decryption by way of a private and public cryptographic key, and validation or authentication by way of a notarization issued by a digital notarization entity, or certificate authority.

It will be appreciated, however, that this is not the only embodiment in which the invention can be implemented. Rather, it can find utility in a variety of security configurations. For example, other commercial applications, aside from smart cards and SIM cards associated with the GSM mobile telephony system may benefit from the features of the present invention. Additionally, the present invention need not be limited by the constraints of the PKI system, but rather may be employed in a variety of security systems that utilize encryption by way of public and/or private keys, and authentication by way of a digital certificate or other similar technique. For the sake of convenience, a brief overview of previous systems, associated with the previous stages of the PKI evolution, will be described hereinafter to illustrate and underscore the differences and advantages of the present invention over such previous systems.

Figure 1A:
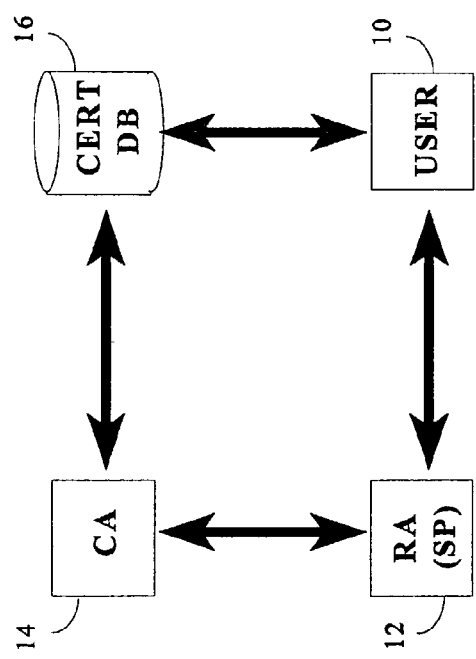
FIG. 1A is a block diagram of the basic elements involved in stage one of the PKI evolution.
Figure 1B:
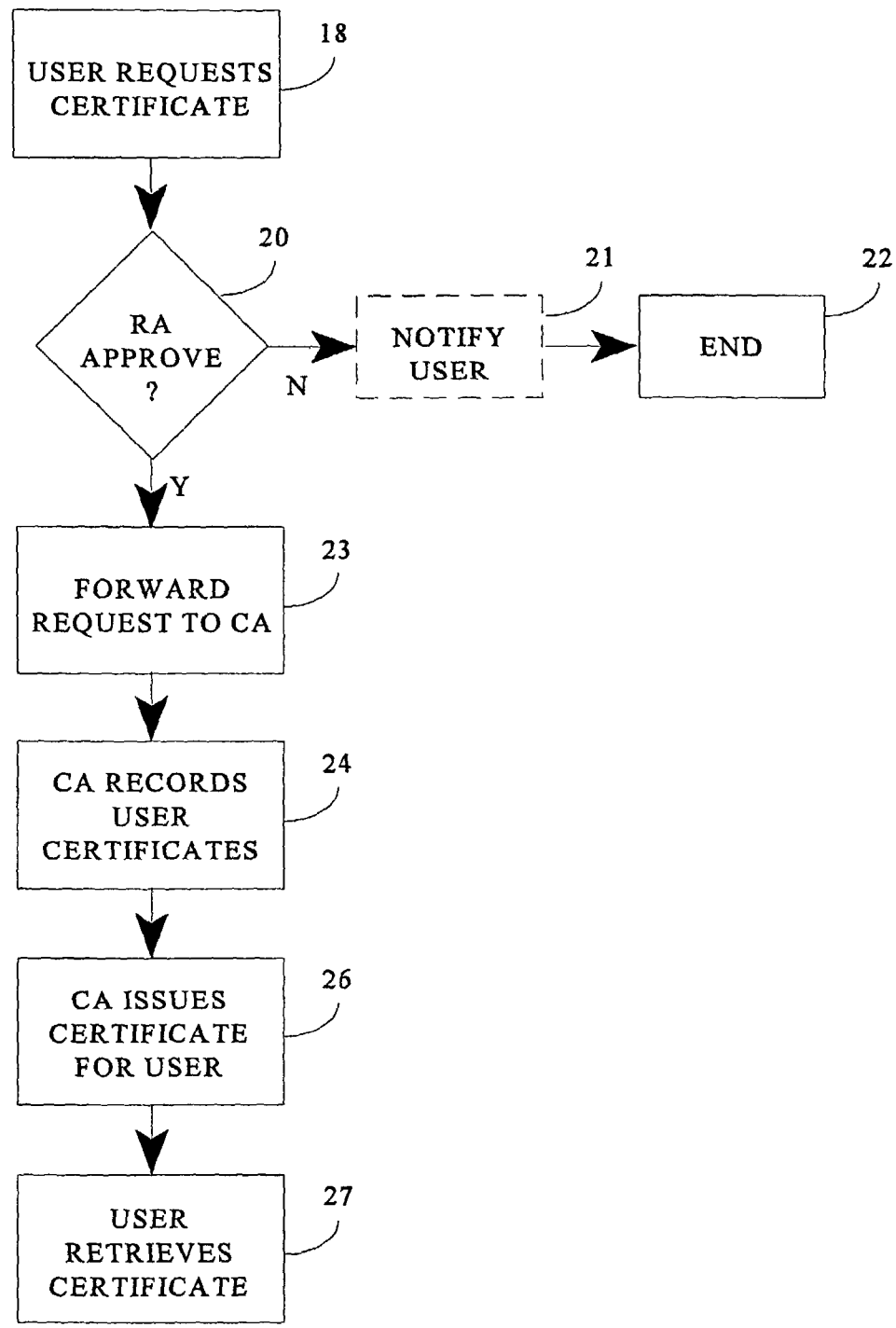
FIG. 1B is a flow diagram of the steps associated with PKI certificate issuance in stage one of the PKI evolution.

In FIG. 1A, a block diagram illustrating the various elements associated with stage one of the PKI evolution is presented. In FIG. 1B, the steps associated with a user requesting and being issued a certificate, using the stage one model of the PKI evolution, are shown. Thus, FIG. 1B will be discussed in connection with FIG. 1A to provide a better illustration of the manner in which the elements of FIG. 1A relate.

Several elements that form the basic structure of stage one of the PKI evolution are shown in FIG. 1A. Specifically, a user 10 is in communication with a registration authority (RA) 12, which is in communication with a certificate authority (CA) 14. The RA 12 in FIG. 1A, may be a service provider (SP), or other suitable registration authority. The CA 14 maintains a certificate database 16 which stores information regarding each of the certificates issued by the CA 14, and which may be accessed by the user 10. Communications between the certificate database 16 and the CA 14 and/or user 10 may be carried out over a trusted communication link to preserve the integrity of the data stored within the database 16. Communications between the user 10 and the RA 12 may be by way of a secure communications pathway. For example, the user 10 may communicate with the RA 12 and CA 14 by way of a peer-to-peer network, in which a direct communications link is provided between the user 10 and the RA 12. Additionally, the user may communicate by way of an open network, such as the Internet, for example. In such a case, the communications could be encrypted. One example of a technique whereby communications between the user 10 and the RA 12 could be encrypted over an open network is by using the secure socket layer (SSL) created by Netscape Communications Corporation, of Mountain View, Calif.

Additionally, communications between the RA 12 and CA 14 could be conducted using either a trusted link, a direct link (e.g., a peer-to-peer communications link), or a secure link over an open network (e.g., an SSL link). Because of the sensitivity of the data stored within the certificate database 16, communications between the CA 14 and the database 16 are generally carried out using a trusted link to protect the integrity of data maintained within the database.

Referring to the steps illustrated in FIG. 1B, a user 10 must request a certificate in stage one of the PKI evolution, as illustrated in step 18. This request is forwarded to the RA 12, which makes a determination in step 20 regarding whether or not this user's request will be granted. If the RA 12 does not approve of the user's request, the user may optionally be notified, as illustrated by optional step 21, and the entire process ends at step 22. If, on the other hand, the RA 12 approves the user request in step 20, this approval is forwarded to the CA 14 in step 23. The CA 14 then records the user certificate information in the database 16 at step 24. Once the user certificate information has been recorded in the database 16, the CA 14 issues a certificate for the user 10 in step 26, and notifies the user that the certificate is stored in the certificate database 16. The user then retrieves the certificate, as shown in step 27.

One of the main disadvantages associated with the model of stage one of the PKI evolution illustrated in FIG. 1A is the burden placed upon the user 10. In this model, the user 10 is required to request a certificate and must then receive the certificate, which generally in stage one of the PKI evolution must be consciously installed by the user 10 before a transaction is to be authenticated. Because this model requires many affirmative acts on the part of the user 10, stage one of the PKI evolution enjoyed limited success.

Figure 2A:
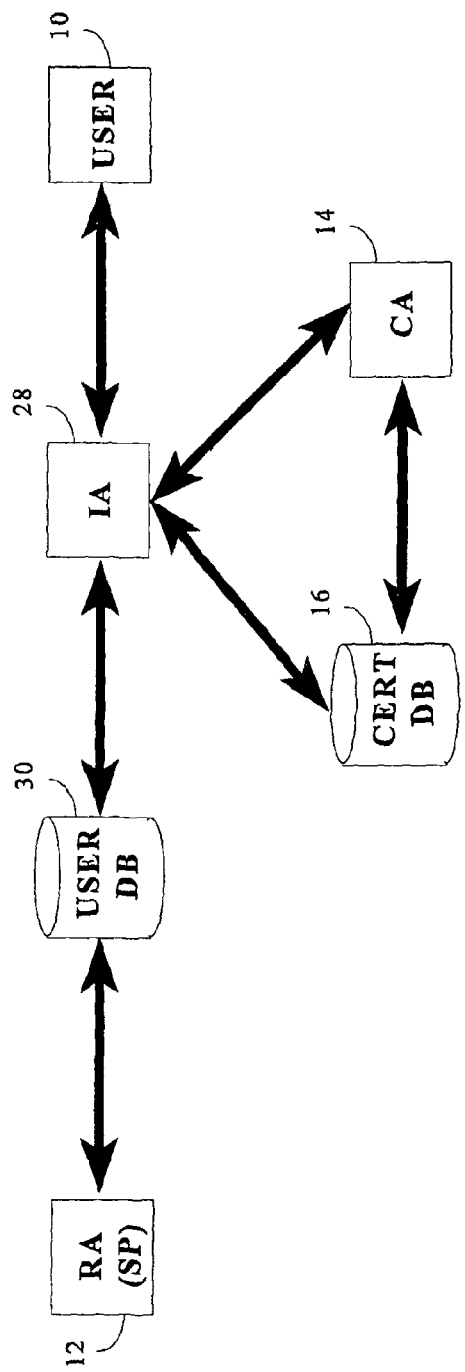
FIG. 2A is a block diagram of the basic elements involved in stage two of the PKI evolution.

Stage two of the PKI evolution is intended to reduce the intensive user requirements imposed by stage one PKI evolution. Specifically, as illustrated in FIG. 2A, an issuance authority (IA) 28 acts as an intermediary requesting a certificate of the CA 14 on behalf of the user 10 and RA 12. In stage two, as in stage one, the RA 12 may be a service provider (SP), or other suitable registration authority. An RA 12 maintains user data within a user database 30. This user data may be accessed by way of the IA 28 in forming requests for certificates on behalf of each user contained within the user database 30. Because of the sensitive nature of the data stored in the user database 30, and the need to maintain its security, communications between the RA 12, the IA 28, and the database 30 are generally carried out using a trusted communications link.

Figure 2B:
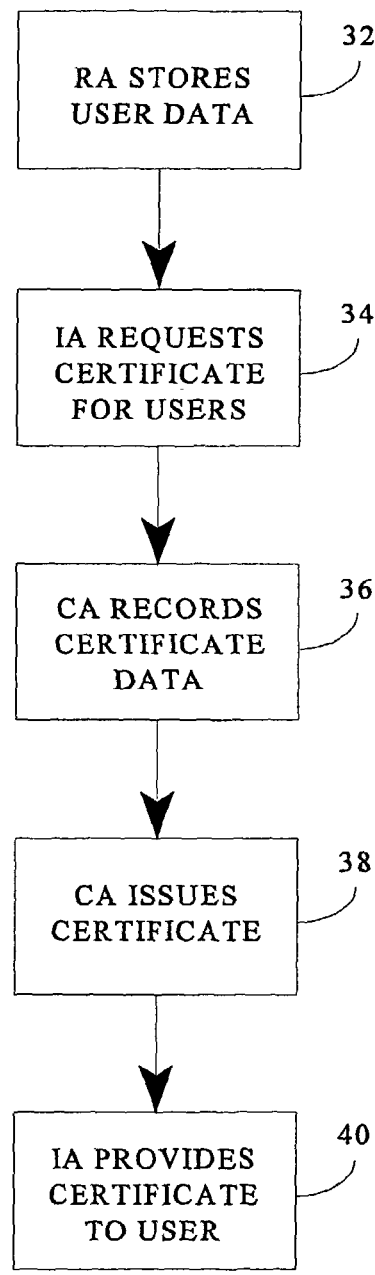
FIG. 2B is a flow diagram illustrating the steps associated with certificate issuance in stage two of the PKI evolution.

The specific steps associated with stage two of the PKI evolution are shown in FIG. 2B. First, in step 32, the RA 12 stores information regarding the various users 10 in the user database 30. The RA 12 in the block diagram illustrated in FIG. 2A may comprise, for example, banks, GSM operators, and other organizations with which the user 10 is associated, and for which the RA 12 maintains customer information. The IA 28 accesses the user data contained within the database 30, and forms a request for a certificate on behalf of the user 10 in step 34. Upon receipt of the request from the IA 28, the CA 14 records the certificate data in the certificate database 16 in step 36, and issues a certificate in the name of the user 10 to the IA 28 in step 38. The IA 28 then provides the certificate to the user 10 in step 40.

Thus, in stage two of the PKI evolution, the user 10 is not required to request the certificate, which is requested on behalf of the user and subsequently transmitted to the user in a secure token or by way of a secure communication link. Stage two of the PKI evolution often used digital certificates contained in devices, such as smart cards, allowing customers to utilize familiar trust models, and eliminating the need for any additional effort on the part of the customers to either request a certificate, or to implement its use.

Specifically, in the realm of smart cards, for example, because a certificate is contained in a device, a user could be issued such a device in a manner familiar to both the customer and the issuing institution. On the surface, such an issuance appears to be the same as the issuance of an ATM bank transaction card, debit card, credit card, or the like. Additionally, using the digital certificate bound to the device is also essentially transparent to the user in stage two of the PKI evolution, and requires no user effort associated with obtaining a certificate. That is, upon activating a smart card, a user is required to enter a password, or PIN number, which is similar to the requirements for using an ATM or debit card. Once the user has entered this passcode, all encryption and authentication by way of public and/or private cryptographic keys and digital certificates is carried out automatically, without any additional effort on the part of the user.

Equally important is the ease of deployment of device certificates by existing entities desiring secure and authenticated communications via an open network. Some such entities might include, for example, financial, government, and health care organizations. Because device certificates are made for use within existing systems, such as the ATM example discussed above, there is little, if any, effort required on the part of institutions for deploying device certificates. Because of the minimum effort required on the part of the user, stage two of the PKI evolution enjoyed somewhat greater success than stage one. However, in stage two, if the certificate was issued in software, the user was still required to consciously use the certificate, which often required installation of authentication software, and the like.

Additionally, stage two exhibited a problem, as knowledge of the user was required when the device was manufactured. Therefore, as networks exist in which the user of a device is not known when the device is manufactured (e.g., telecommunications networks), the use of the model of stage two is not always possible. Therefore, stage three of the PKI evolution was developed, which implemented the use of device certificates. The device certificates of stage three were created to allow the addition of user information to a trusted device over an open network. This information could be added without prior knowledge of the user's identity, and could be added after the device was manufactured.

Figure 3A:
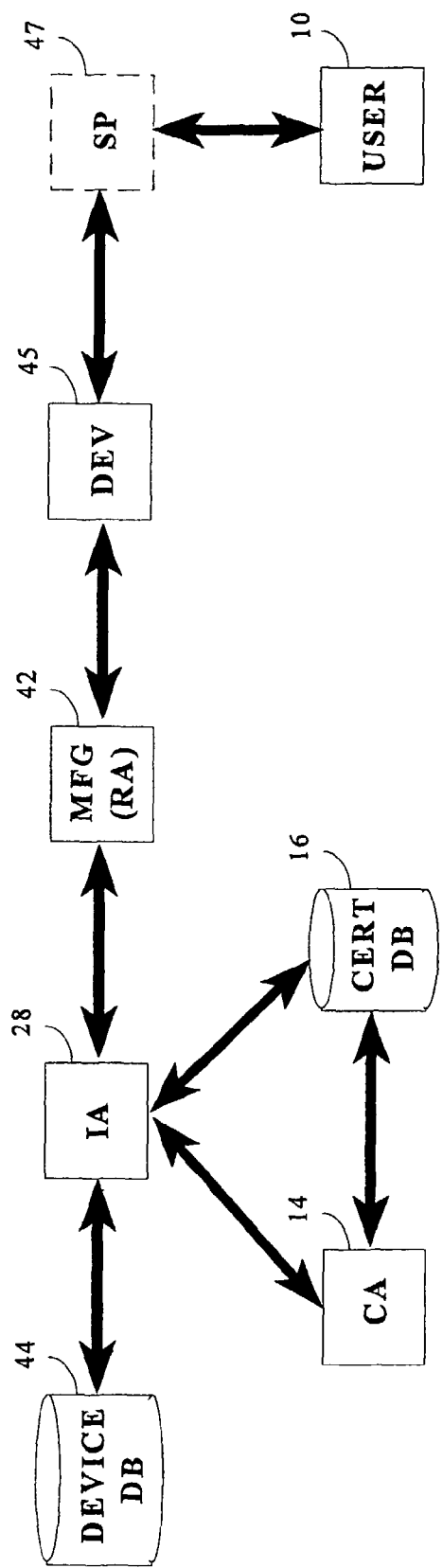
FIG. 3A is a block diagram illustrating the basic elements of PKI certificate issuance, where the certificate is bound to device identifier(s).

The block diagram shown in FIG. 3A illustrates the elements involved in stage three of the PKI evolution and the elements associated with an embodiment of the present invention. The flow diagram illustrated in FIG. 3B illustrates the steps associated with stage three of the PKI evolution, and will be discussed in connection with FIG. 3A.

In stage three of the PKI evolution, since certificates are bound to device identifiers at the time of manufacture, the manufacturer (MFG) 42 plays an important role in assigning certificates. One important function that the manufacturer 42 provides is maintaining data regarding each of the devices in a device database 44. This data regarding each of the devices is used to bind cryptographic information to the device information via a certificate. Additionally, in stage three, the MFG 42 can act as a registration authority (i.e., performs similar functions as RA 12 shown in FIGS. 1A and 2A). The IA 28 communicates to each device (DEV) 45, which may optionally be distributed via a service provider (SP) 47.

Figure 3B:
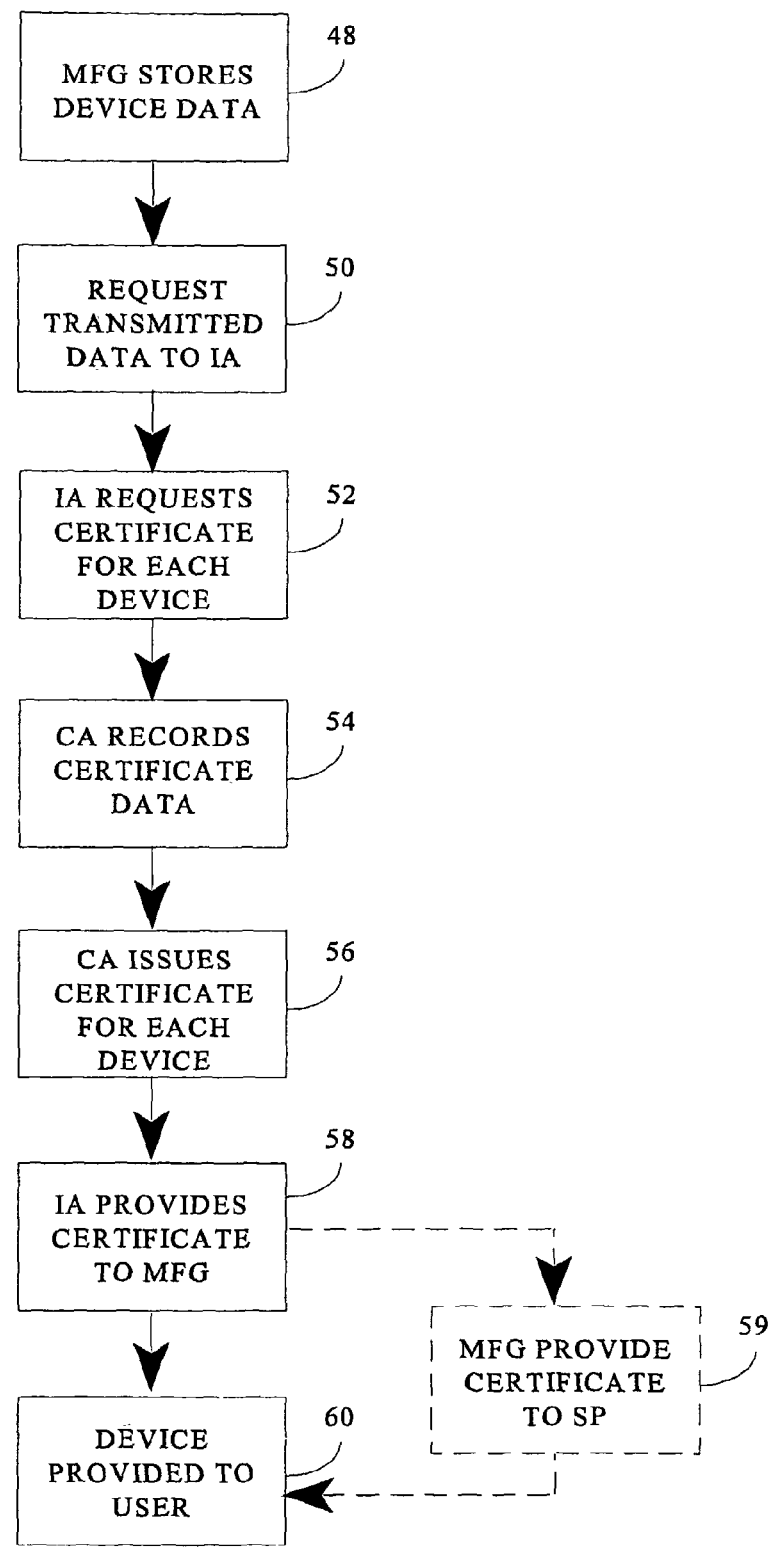
FIG. 3B is a flow diagram illustrating the steps associated with certificate issuance in stage three of the PKI evolution.

In FIG. 3B, a flow diagram illustrating the steps associated with a user obtaining a device having a certificate bound thereto in stage three of the PKI evolution is shown. First, the manufacturer 42 stores information regarding each device produced in a device database 44 at step 48. This information stored in the device database 44 is accessed by the IA 28 in step 50. Upon receipt of this data, the IA 28 requests in step 52 certificates individually for each device whose data it has accessed from the device database 44. This request is made of CA 14, which in step 54 records the certificate data of the certificates to be issued in the certificate database 16, and in step 56 issues certificates for each device to the IA 28 thereby associating individual certificates with individual devices. The IA 28 in step 58 issues the certificates for each of the devices to the manufacturer 42. Optionally, the manufacturer 42 may provide the certificate to the service provider 47, as shown in optional step 59. In turn, the manufacturer 42 (or optionally the SP 47) provides the devices to the user 10 in step 60. It will be recognized by those skilled in the art that an intermediary, such as a retailer, service provider, or the like is frequently used in providing devices to users from the device manufacturer.

As discussed above, stage three of the PKI evolution is advantageous for several reasons, including the transparency of the entire process of requesting, receiving, and using a certificate for users either known or not known at the time of device manufacture. However, as previously indicated, one of the major drawbacks of stage three is the PKI evolution is the cost associated with assigning certificates to individual devices which are mass produced, which unlike the relatively insignificant cost in stage one of single certificates born by the user, is multiplied many times over and usually born by the manufacturer, or service provider and is therefore relatively high when compared with single certificates issued to individual users.

Additionally, costs in stage three of the PKI evolution become even more significant because of the essentially transparent process of requesting certificates. Specifically, unlike stage one where users were reluctant to request certificates because of the large effort required, with the advent of the essentially transparent process of stage three of the PKI evolution, many more users are likely to receive and potentially use certificates. Moreover, in stage three each user may require multiple certificates for each of the user's devices, where the same users would possibly require only a single certificate in stage one of the PKI evolution. Because of all of these factors, the cost associated with stage three of the PKI evolution has become an crucial consideration in commercial models, and in many cases has become overly burdensome for manufacturers and/or service providers to bear.

Accordingly, the present invention addresses the concerns raised in connection with the first three stages of the PKI evolution, while providing the user with all of the advantages and conveniences enjoyed by users utilizing certificates issued in the relatively transparent manner of stage three of the PKI evolution. Rather than binding certificates to individual devices, the present invention allows for certificates to be bound to a group of devices, such as a manufacturing batch or lot. Thus, when devices are manufactured in batches or lots of relatively high numbers (e.g., approximately 10,000 devices), the cost associated with certificates for the devices, when divided among all of the devices of a manufacturing batch, becomes negligible. Therefore, with the minimal effort required by the users to acquire and utilize certificates coupled with the minimal cost to manufacturers for providing such certificates, the present invention greatly facilitates e-commerce, such as commerce via the Internet, mobile commerce or the like.

Figure 4A:
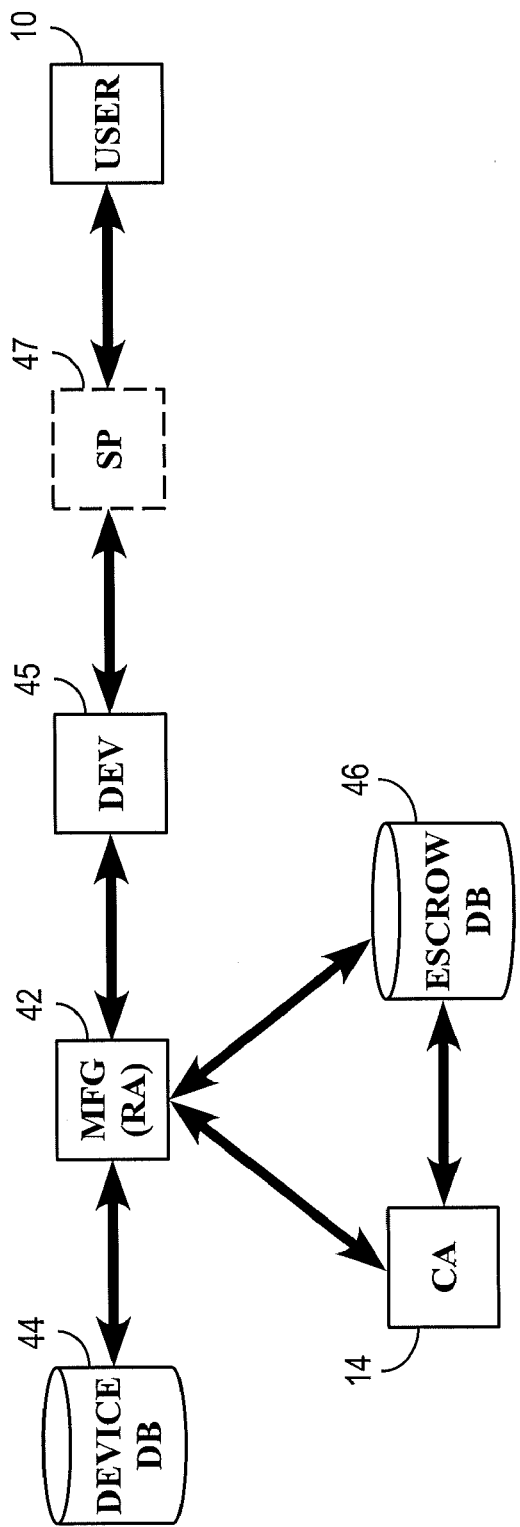
FIG. 4A is a block diagram illustrating the basic elements of device batch certificates in accordance with an embodiment of the present invention.

A block diagram of an embodiment of the present invention is shown in FIG. 4A. In FIG. 4A, the manufacturer (MFG) 42, which maintains the device database 44 and communicates with the CA 14, in accordance with an embodiment of the present invention, acts as a registration authority (RA). The CA 14 maintains an escrow database 46, in which a permanent record, or manifest, of all devices 45 associated with a particular certificate may be stored. Devices 45 are then distributed to send users by the manufacturer 42, or optionally by the service provider 47.

Figure 4B:
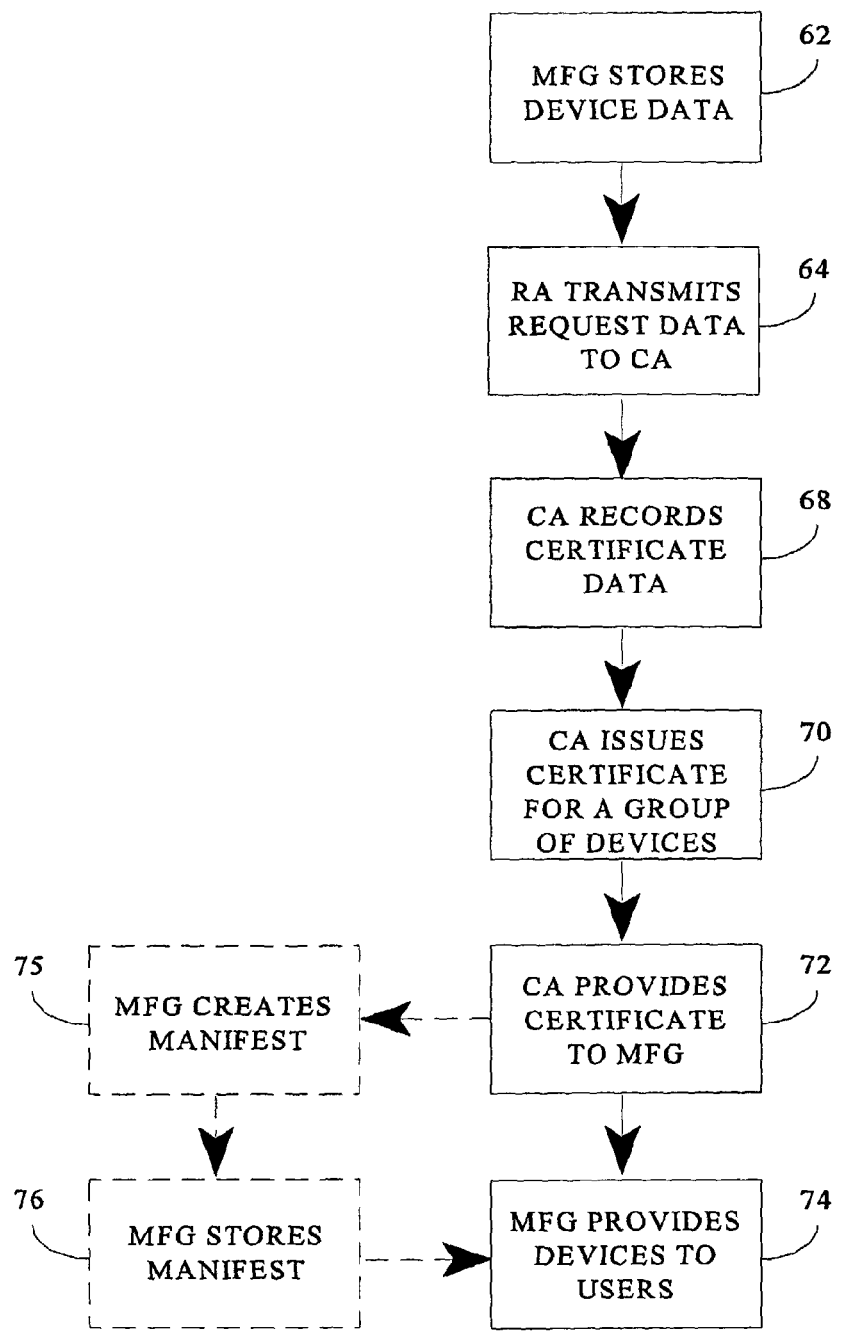
FIG. 4B is a flow diagram illustrating the steps associated with an embodiment of the present invention.

The flow diagram illustrated in FIG. 4B sets forth various steps associated with an embodiment of the present invention. Specifically, the steps outlined in FIG. 4B illustrate the manner by which a group of devices is bound to a single certificate, and the certificate is issued for a group of devices 45. First, the manufacturer 42 stores device data in a device database 44, in step 62. The RA 12 in step 64 transmits device data which has been acquired from the device database 44 to the CA 14, requesting a single certificate for a group of devices. The CA 14 then records the certificate data in step 68 and issues a certificate for the group of devices in step 70 and issues a group certificate in step 70, which it provides to the manufacturer 42 in step 72 thereby associating the certificate with a group of devices. Once the manufacturer 42 has been provided with the certificate for the group of devices, it then may provide devices to the users, as set forth in step 74.

Optionally, the manufacturer in step 76 may also create a manifest, which is described in greater detail below in connection with FIG. 5.

The manifest may also optionally be stored by the manufacturer in an escrow database 46 for future reference. In accordance with an embodiment of the present invention, the escrow database 46, shown in FIG. 4A, may be used by the manufacturer 42 to maintain a manifest, such as the one described in connection with FIG. 5 below, associating device batch and certificate information in a permanent record (i.e., in escrow).

Figure 5:
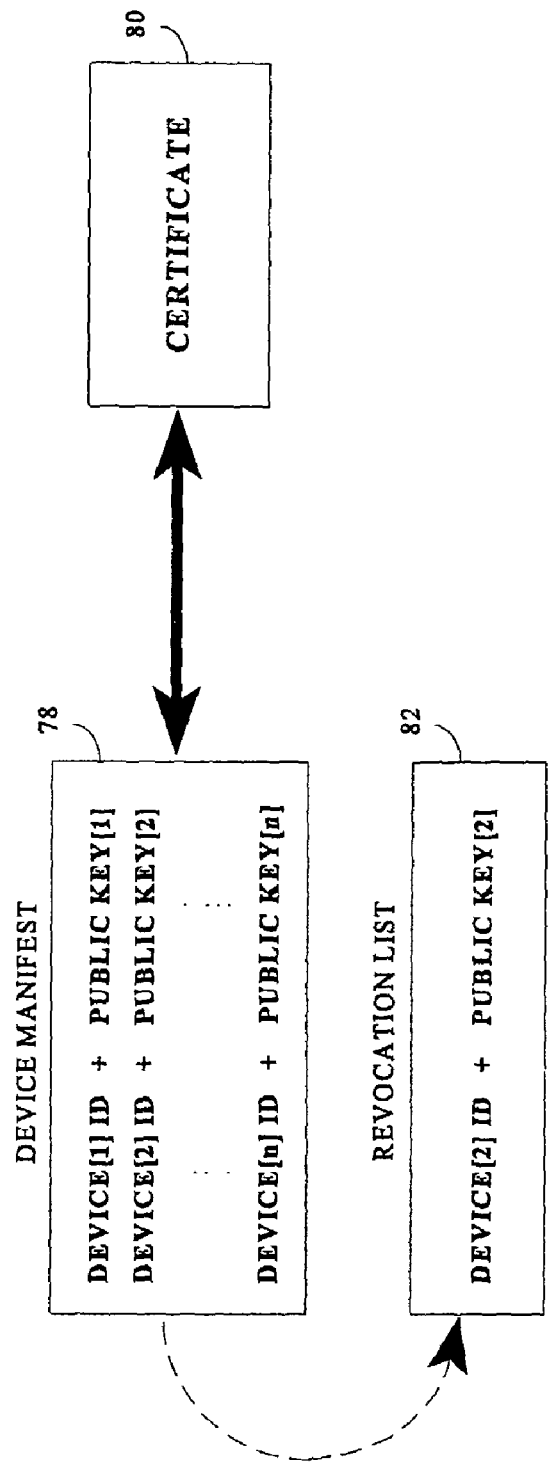
FIG. 5 is an illustration of a device manifest used in accordance with an embodiment of the present invention.

In FIG. 5, a device manifest 78 is shown, which indicates the device identifier and public key related to each device within the group or batch of devices bound to a certificate 80, in accordance with an embodiment of the present invention. This manifest 78 may be created by the manufacturer 42 at the time when the certificate for a group of devices is received from the CA 14, or may optionally be created by the CA 14 or a digital notary. The manifest 78 is stored as a permanent record in a manifest database 46, which is shown in FIG. 4A, as evidence of the devices originally belonging to the group shown in the manifest 78, which are bound to the certificate 80. Also, at the time of the creation of the manifest 78, and manufacturer 42 (or the CA 14) may optionally create a revocation list or hot list 82, which contains devices that are no longer operational, or for which the certificate 80 has been revoked.

At the time of creation by the manufacturer 42 (or the CA 14), the revocation list 82 may be empty. However, with time, as devices are lost, stolen, or decommissioned, their identifiers along with their public key are added to the revocation list 82 for future identification purposes (e.g., in refusing authentication of devices). For example, in the situation illustrated in FIG. 4, the second device (Device [2]) listed in the manifest 78 using the device identifier 2 is also listed in the revocation list 82. Thus, whenever the device identified by the device identifier 2 is used, an authenticating agency will recognize the device (Device [2]) no longer has the right to use the certificate 80, for whatever reason, because it is present in the revocation list 82 even though it still appears within the manifest 78. By way of a revocation list 82, the manifest 78 may be maintained as a permanent list of the devices extant at the time of binding the certificate 80 to the group of devices shown in the manifest 78. Because this list is permanent and has not been altered, there is a high degree of confidence that its contents are accurate. The revocation list 82 will be certified or notarized and may be distributed to various agencies that track the revocation of digital certificates.

Figure 6A:
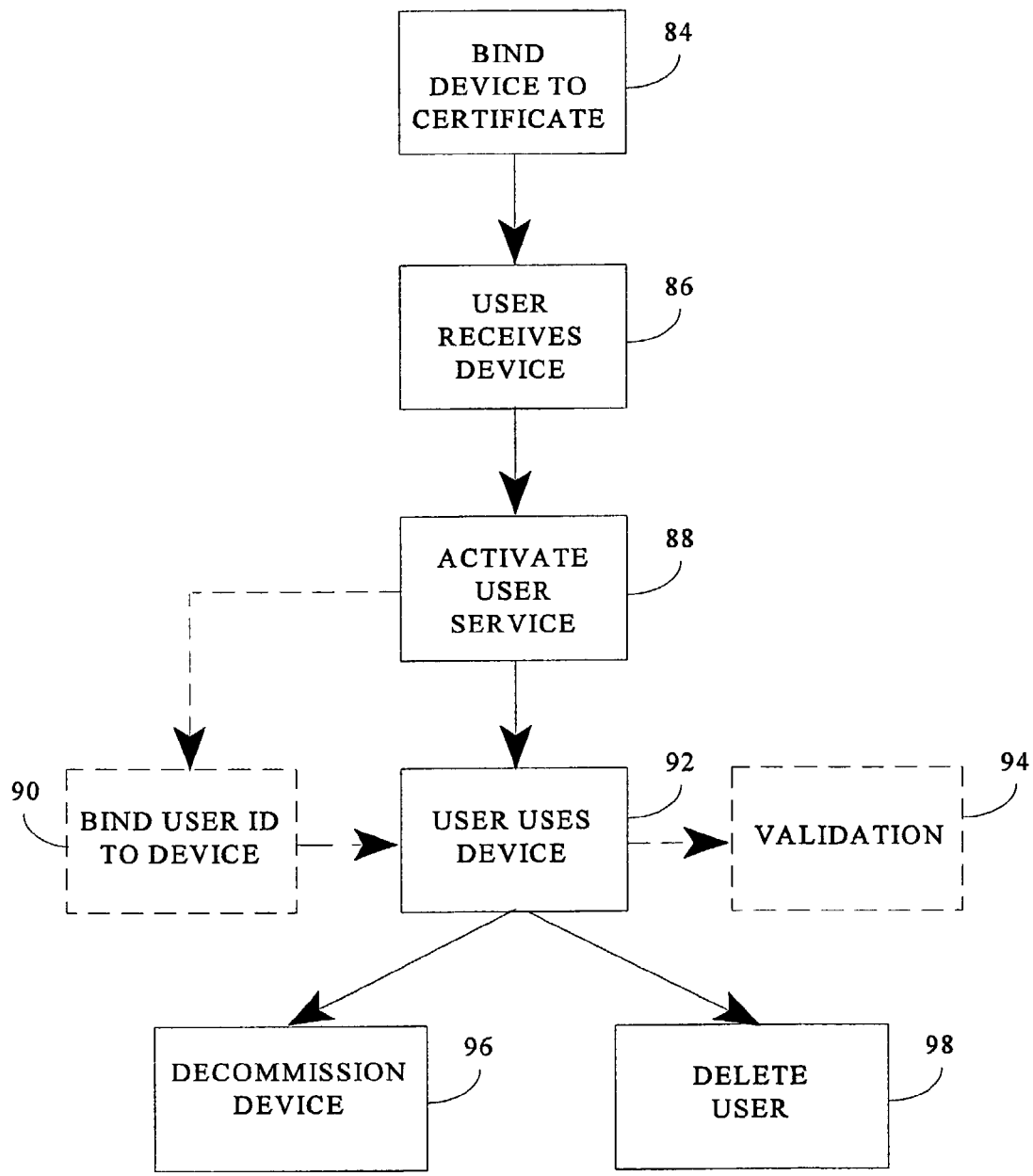
FIG. 6A is a flow diagram illustrating the basic stages of the lifetime of a device in accordance with an embodiment of the present invention.

Various phases of the use of certificates bound to groups of devices in accordance with the present invention are shown in FIG. 6A. In FIG. 6A, a device is first bound to a certificate a part of a group of devices to which it belongs in step 84, which step is described in greater detail above in connection with FIGS. 4A and 4B. Once the device has been bound to the certificate, by way of the group of devices, the user receives the device in step 86, which step is described in greater detail below in connection with FIG. 6B. Once the user has received the device, the user may then activate a service in step 88, which step is discussed in greater detail below in connection with FIGS. 7A and 7B. Optionally, the user's identity may be bound to the device, as shown in optional step 90, which is discussed in greater detail in connection with FIG. 7C. The user then uses the device in step 92, and validation may be performed in step 94 to ensure that the device is authentic, and is not part of a revocation list or hot list, or discussed below in connection with FIGS. 9A, 9B, and 9C.

Once the device has served its useful life, it is decommissioned in step 96. User information may be stored in a separate record maintained by a service provider or other requesting authorities and may not be necessarily bound to the device. Because the user identity may be bound to the device by a separate mechanism in step 90, the deletion of device information from the system may not be sufficient, but an additional step 98 may also be required in which the user identity is deleted from the system. However, those skilled in the art will recognize that both may not be necessary. For example, if a user loses his or her device, the device may require decommissioning, or rather the identifier of the device may need to be placed in the revocation list; however, the user identity may still be valid, and it may be possible to associate the same user information with another device. Thus, no need would exist for deleting the user information. In contrast, if a user passes away, or moves beyond the range of the service provided by the device, it may be necessary to delete the user information in step 98; however, the device may still be fully functional. In such a case, it may not be desirable to commission the device, but rather to associate a new user identity with the same device.

A variety of services, such as mobile telephony, (e.g., GSM), smart card Internet transactions, wireless web applications, and the like may be used in connection with the present embodiment, such as the embodiment shown in FIG. 4A. It will be recognized that depending upon the type of application for which the model shown in FIG. 4A is used, various elements of this system may be slightly adapted for the desired application. For example, the service provider 47 may be a mobile telephony service provider (e.g., GSM operator), a wireless web provider, or the like.

Figure 6B:
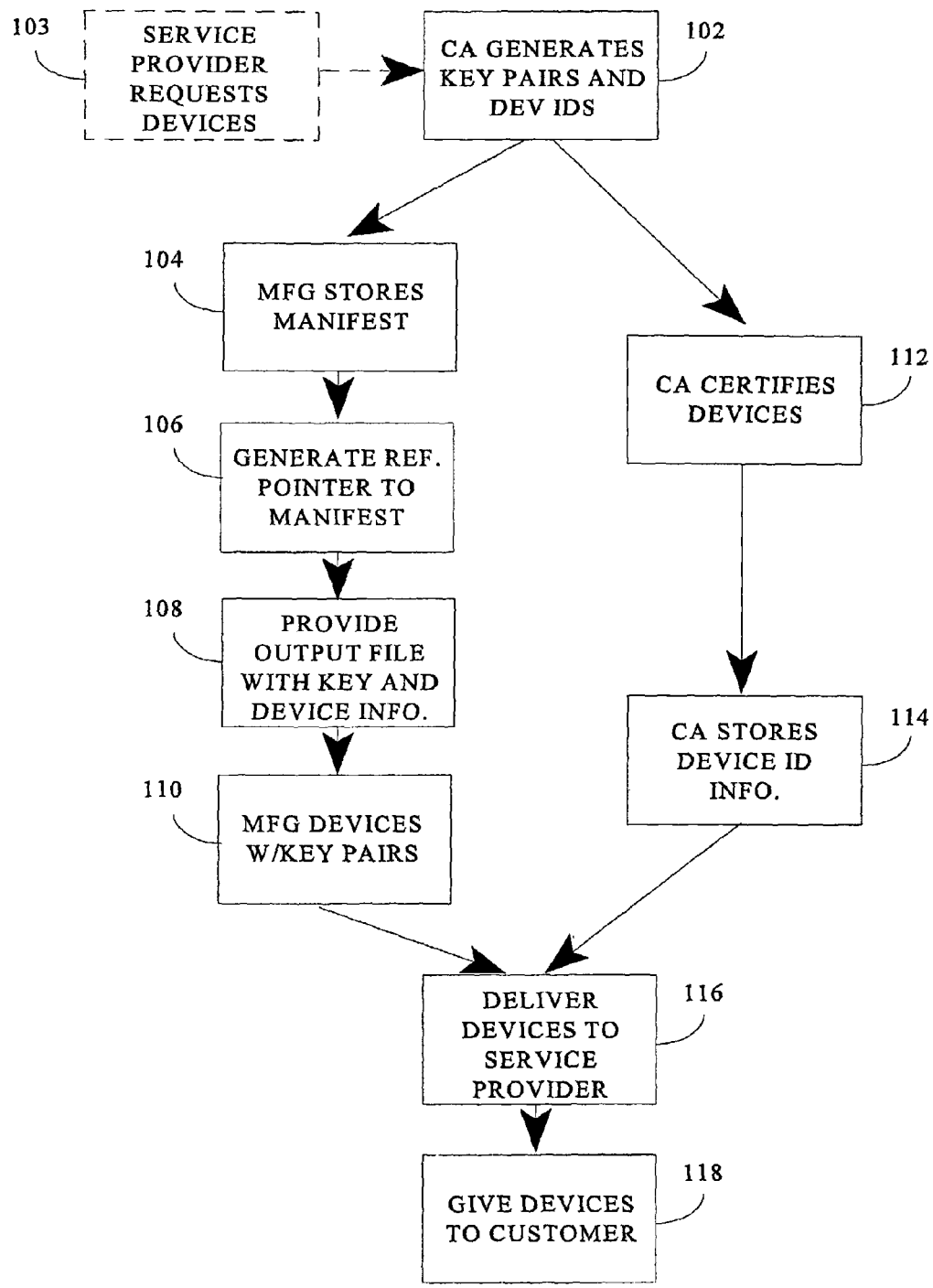
FIG. 6B is a flow diagram illustrating the steps associated with binding a certificate to a group of devices, and issuing a device to a customer in accordance with an embodiment of the present invention.

The flow diagram of FIG. 6B shows steps associated with distributing devices to users in accordance with various embodiments of the present invention. First, a number of key pairs and device identifies, which are each associated with devices to be manufactured by the manufacturer 42 and are generally contained in a device list are generated in step 102. This generation step 102 may be performed by the CA 14 or the MFG 42 acting as an registration authority in response to a request by the service provider 47, which is shown as an optional step 103. The manufacturer 42 stores a device list manifest in step 104, allowing the keys generated to be matched to each device within the device list. It will be recognized by those skilled in the art that the key pairs, in lieu of being generated by the CA 14 or MFG 42, could be generated by the service provider 47. Additionally, the key pairs could be generated by a hardware security module (HSM), which generates the key pairs within hardware rather than software, such hardware generation being much more secure and impervious to attacks (e.g., by hackers, etc.). The HSM may belong to the MFG 42, CA 14, SP 47, or may be operated by other trusted entities.

In step 106, a reference pointer to the manifest, stored in step 104, is generated. The reference pointer to the manifest generated in step 106 is a pointer that specifies the manifest in which the device is listed, and that device's location within the manifest, which may be presented in the form of a combined manifest identifier and device offset. An output file is provided to the service provider 47 in step 108 containing the public key information generated in step 102, the reference pointer to the manifest generated in step 106, and the device information with which the key information is associated. In accordance with an embodiment of the present invention, only the public key associated with each device is provided to the service provider 47, maintaining the private key secret and stored within the hardware of the device itself.

The devices 45 are then manufactured in step 110 by the manufacturer 42. As mentioned above, in accordance with an embodiment of the present invention, the private key pairs generated in step 102 and the reference pointer to the manifest generated in step 106 are stored in the hardware of each device. Those skilled in the art will recognize that a variety of safeguard measures may be employed in storing public and private cryptographic key information in the hardware of a device. Any suitable, secure method for storing such key pair information on the device may be employed within the scope of the present invention.

Independently of steps 104, 106, 108, and 110, being carried out by the manufacturer 42, the CA 14 operated to certify the devices. The CA 14 certifies the devices on the device list in step 112, and stores device identification information in a device database 44 at step 110. This device identification information stored in the device database 44 is available for later validation of each device when used in commercial activities.

The manufacturer 42 then delivers the devices to the service provider 47 in step 116, and the service provider 47 provide the devices to the customer, or user 10, in step 118. In the case of a GSM mobile telephony system, the service provider 47 (i.e., the GSM operator) provides a SIM card to a customer, which the customer may then utilize in a GSM phone and the manufacturer 42 is the manufacturer of the SIM card. In the case of a smart card to be used as part of a credit card, for secure online transactions, and the like, the service provider 47 may be a credit card company, and the manufacturer 42 could be a smart card manufacturer. Thus, the end user 10 deals as he or she has done in the past with the service provider, and the underlying infrastructure provides the security capability, in the form of smart card, a SIM card, or the like device, which is bound to a digital certificate by way of a group of devices, the underlying infrastructure being transparent to the user.

Once the device has been issued to a user, the user then must activate the device prior to using it. The system in which device activation is carried out is illustrated in block diagram form in FIG. 7A. The steps associated with using the system shown in FIG. 7A are set forth in the flow diagram shown in FIG. 7B, and will be discussed in connection with FIG. 7A.

Figure 7A:
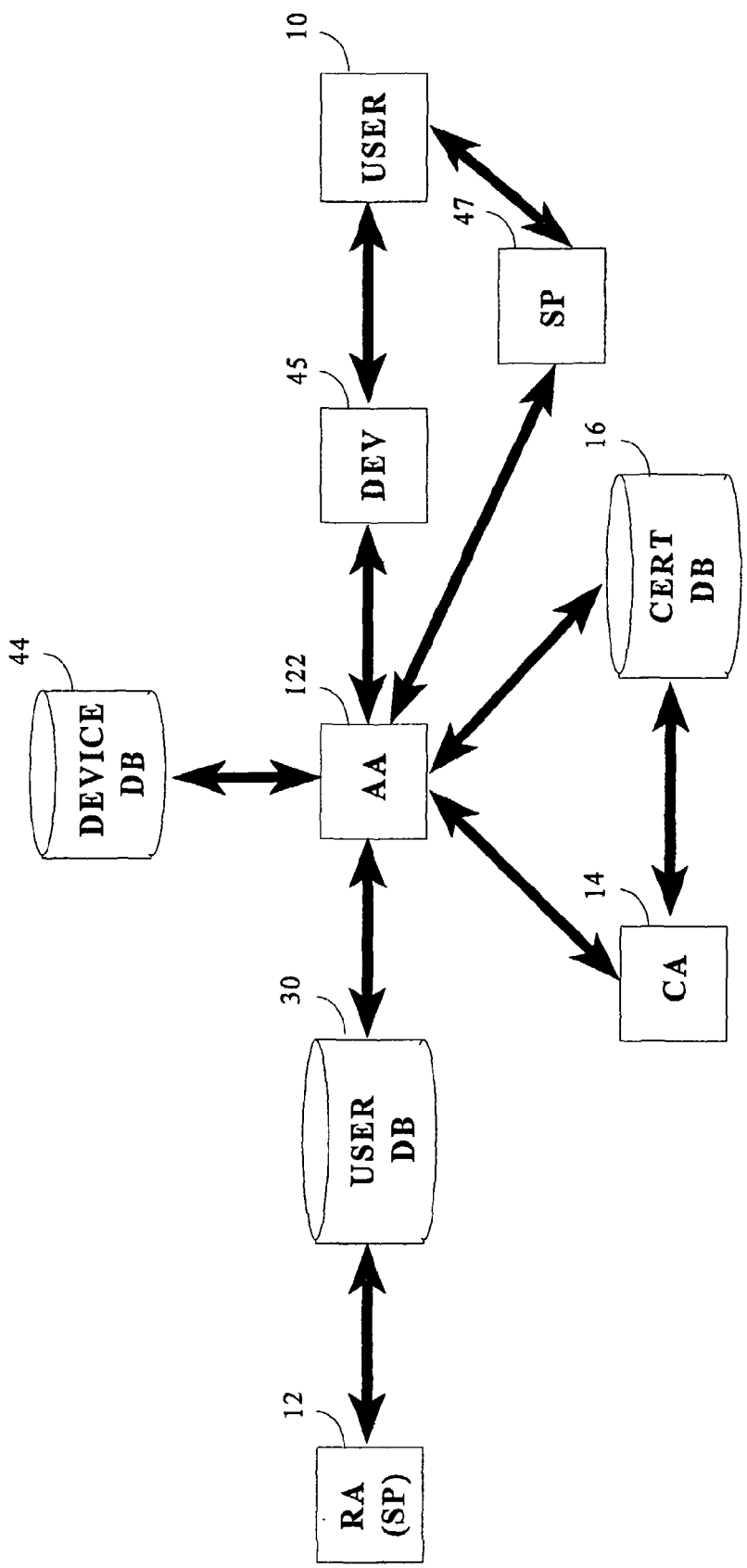
FIG. 7A is a block diagram illustrating the basic elements associated with device activation in accordance with an embodiment of the present invention.

In FIG. 7A, the system in which a user device 45 is activated is illustrated. The system utilizes an activation authority (AA) 122, which communicates with the devices 45, the device database 44, the user database 30, the certificate database 16, and the CA 14. The AA 44 may optionally be connected to an SP 47. The CA 14 records information regarding user certificates in the certificate database 16. An RA 12, which may optionally be a service provider, is configured to access the user database 30.

Figure 7B:
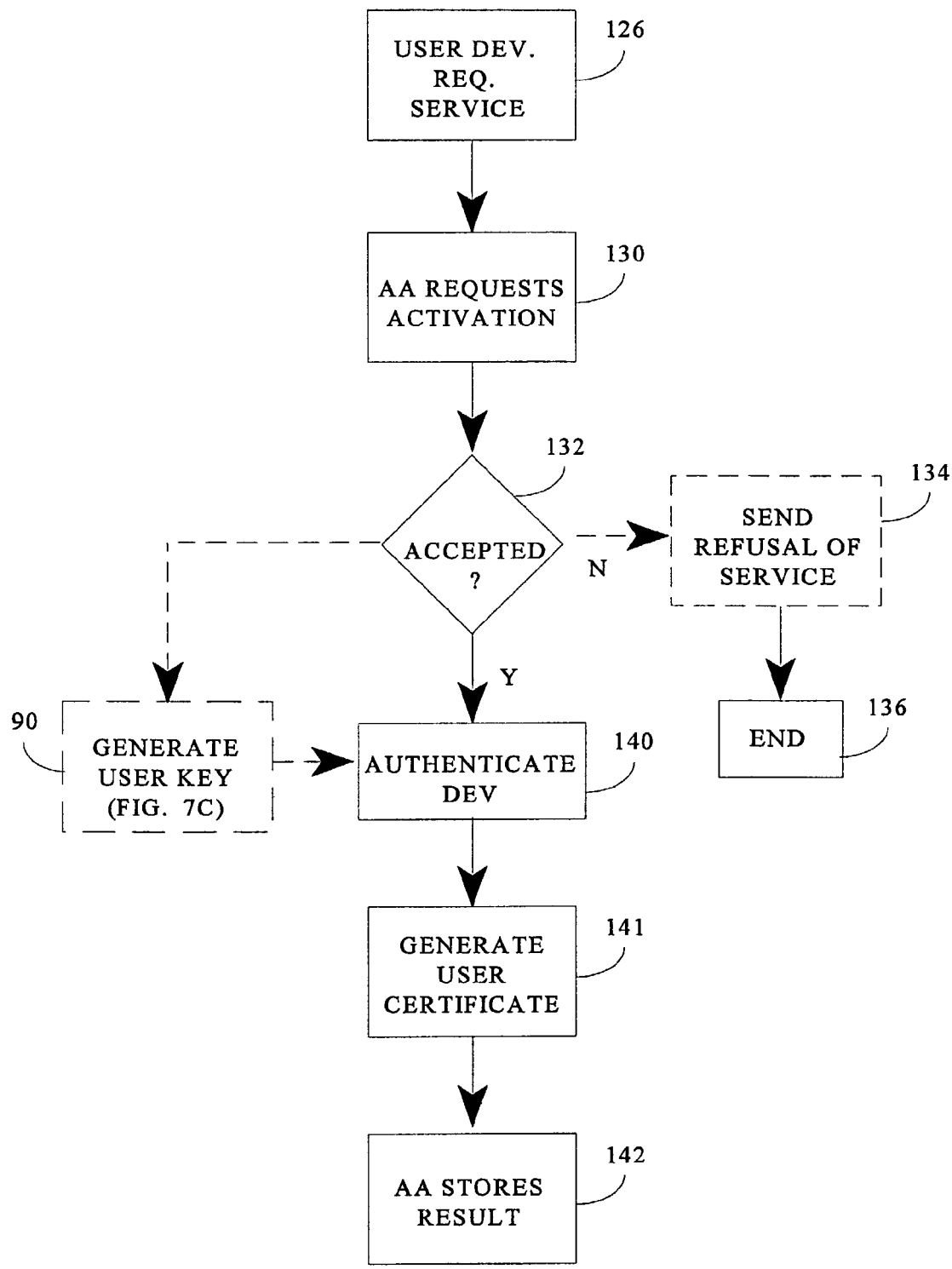
FIG. 7B is a flow diagram illustrating steps associated with device activation in accordance with an embodiment of the present invention.

Activation is begun when a user requests activation of service from the service provider 47, as shown in step 126 of FIG. 7B, by way of various means including the user device 45, telephone service, the Internet, or in person. The SP 47 then requests the AA 122 to activate the service using gateway on behalf of the user device 45, which may, in accordance with an embodiment of the present invention, comprise a wireless application protocol (WAP) or over-the-air (OTA) gateway. A determination is made in step 132 as to whether or not the activation request will be accepted. If the activation request is not accepted, then a refusal message may optionally be sent to the AA 122 as shown in optional step 134. Then, the process ends in step 136. If, on the other hand, the activation request is accepted, then one of two things may happen. Either the device may be directly authenticated in step 140, or the optional step of generating a user key in optional step 138 may occur before the device is authenticated in step 140. The manner by which the user key pair is generated in step 138 is shown in greater detail in FIG. 7C. Once the device has been authenticated, a user certificate is generated in step 141, and the AA 122 sends the results to the SP 47 in step 142.

Figure 7C:
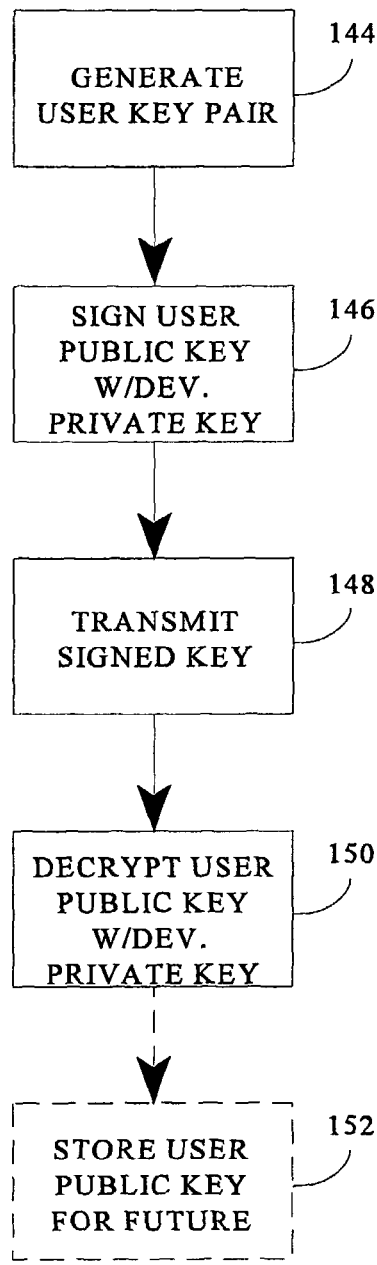
FIG. 7C is a flow diagram illustrating steps associated with generating a user key pair in accordance with an embodiment of the present invention.

The steps associated with generating a user key pair, in accordance with an embodiment of the present invention, are illustrated in the flow diagram shown in FIG. 7C. Once the user device 120 has been activated by the user, which may include, for example, entering a PIN number, a password, or other passcode, a user key pair is generated in step 144 within the hardware of the device 120. Because the user key pair is generated within hardware, it is more secure, and less likely to be copied than a software key pair. However, it will be recognized that other key pair generation techniques could be implemented within the present invention, with varying degrees of security. The device 120 then signs the user public key, generated in step 144, with the device private key in step 146. This signed user public key is then transmitted in step 148, and upon receipt by the AA 122, or other network authority concerned with device identification, is decrypted in step 150, using the device public key. Optionally, as shown in step 152, the user public key may be stored in a system database for future reference during future transactions (e.g., for authentication purposes). These user certificates are stored within the user certificate database 125.

By the technique described above, the entity decrypting the user public key is relatively assured that the user key pair was created on a trusted device, as it must be signed with the appropriate device private key. In accordance with an embodiment of the present invention, the technique of signing a user key with the device's private key is made such that only keys generated by the device are permitted to be signed by the device's private key, thereby ensuring that the user key pair was created within the device. Because the device must be accessed by way of a PIN number, a passcode, or the like, an authorized user must be in possession of the device when such a key is generated.

Figure 8:
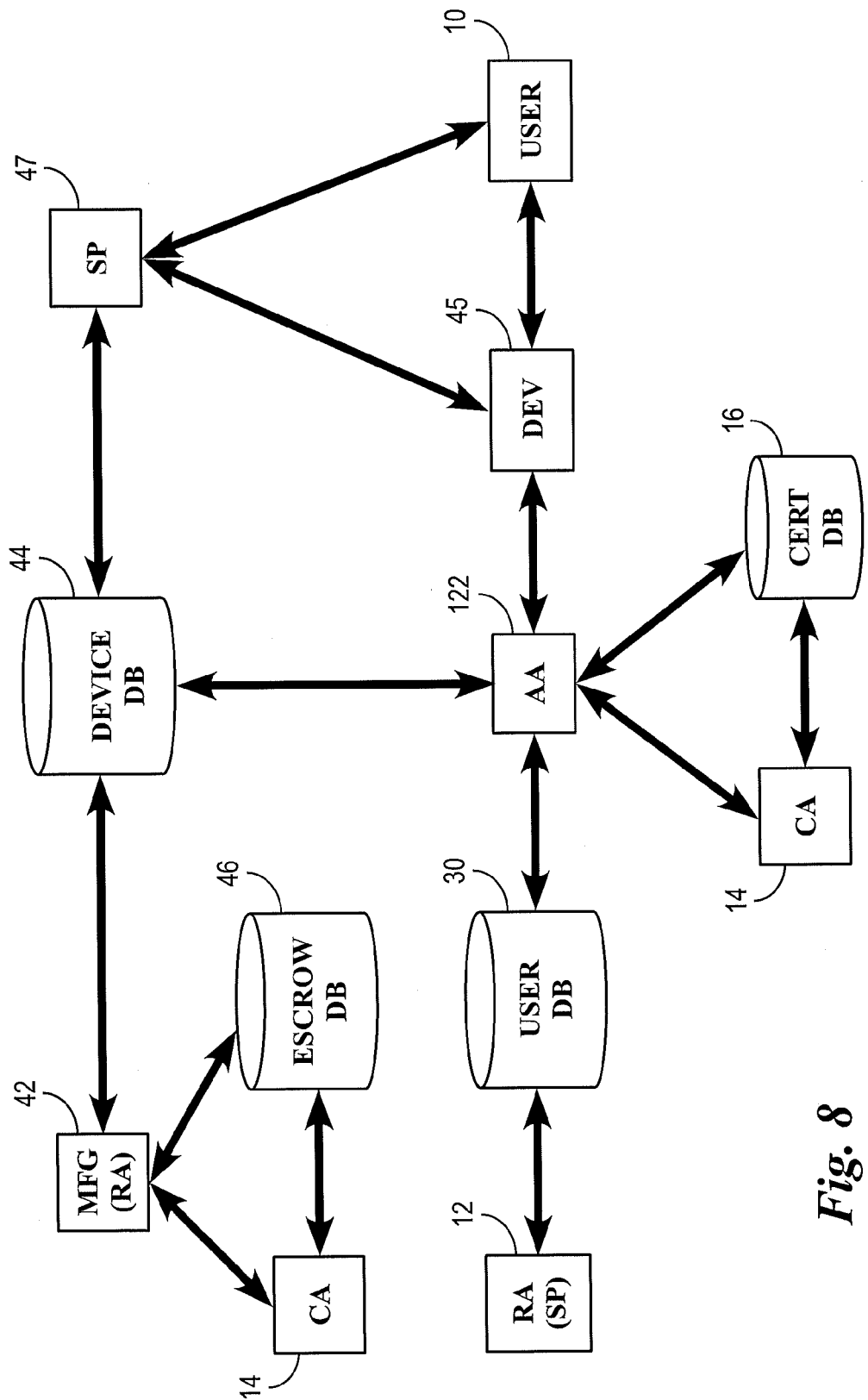
FIG. 8 is a block diagram of an embodiment of the present invention relating elements of FIGS. 4A and 7A.

FIG. 8 is a block diagram illustrating how the device batch system shown in FIG. 4A and the device activation system shown in FIG. 7A interrelate, in accordance with an embodiment of the present invention. It should be noted that the manufacturer 42 may act as a registration authority, as described above. However, it will be recognized by those skilled in the art that another, separate device could be used as a registration authority. Additionally, the registration authority (RA) 12, described above, may comprise a service provider, such as SP 47. CA 14 is shown as being in communication with both MFG 42 and AA 122. However, in accordance with an embodiment of the present invention, the CA 14 in communication with the MFG 42 may relate to device certificates, while the CA 14 in communication with AA 122 may relate to user certificates. Thus, the functionality of CA 14 may be divided into device and user functions, which may be embodied within the same physical device, or separate physical devices.

Figure 9A:
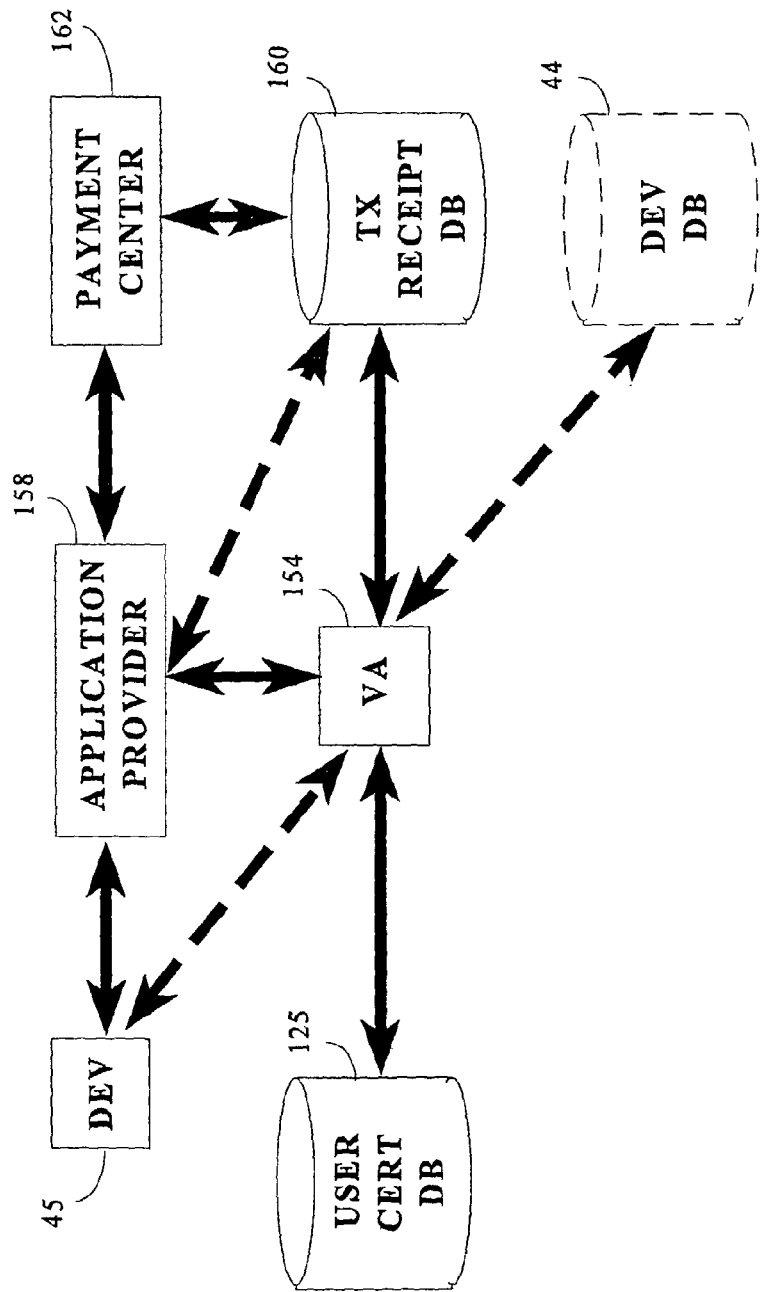
FIG. 9A is a block diagram illustrating the elements associated with validation of a device in accordance with an embodiment of the present invention.

The validation system used for validating transactions in connection with an embodiment of the present invention is shown in FIG. 9A. The flow diagrams is shown in FIGS. 9B and 9C illustrate in detail the steps associated with the validation carried out by the validation system shown in FIG. 9A and will be discussed in connection with FIG. 9A.

In FIG. 9A, a validation authority (VA) 154 communicates with a user device 120 by way of an application provider 158, or optionally directly to the device. It will be understood by those skilled in the art that this may be accomplished via a gateway, which may be accessed by the user device 120 via other entities, such as a service provider or the like. The VA 154 also communicates with the payment processing center 162 via the application provider 158. Transaction receipts are stored by the VA 154 in the transaction receipt database 160, while user certificates are stored in the user certificate database 125, which may be accessed by the VA 154. The transaction receipt database 160 may optionally be accessed by the application provider 158, and a device database 44 may optionally be accessed by the VA 154.

Figure 9B:
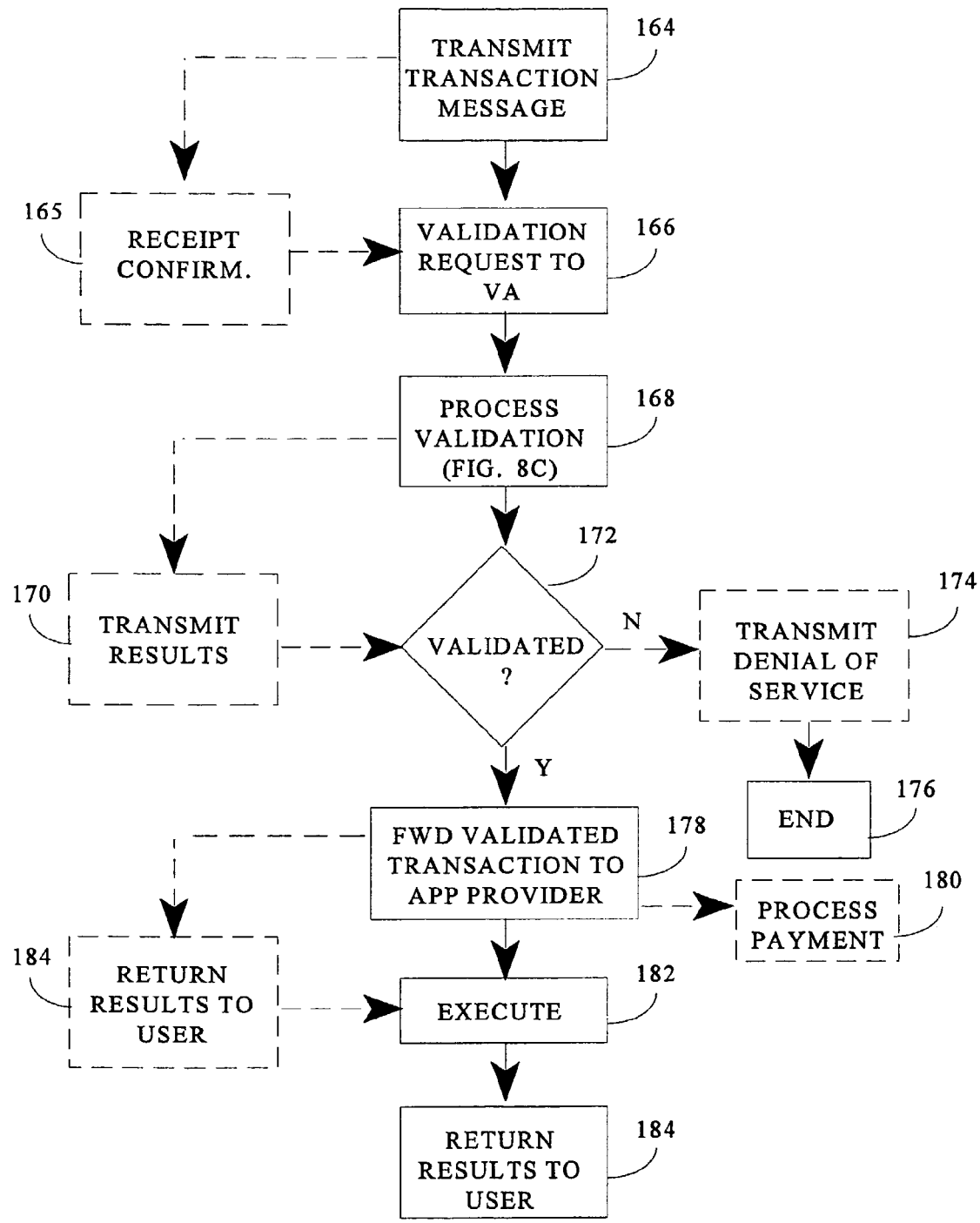
FIG. 9B is a flow diagram illustrating the steps associated with validating a device in accordance with an embodiment of the present invention.
Figure 9C:
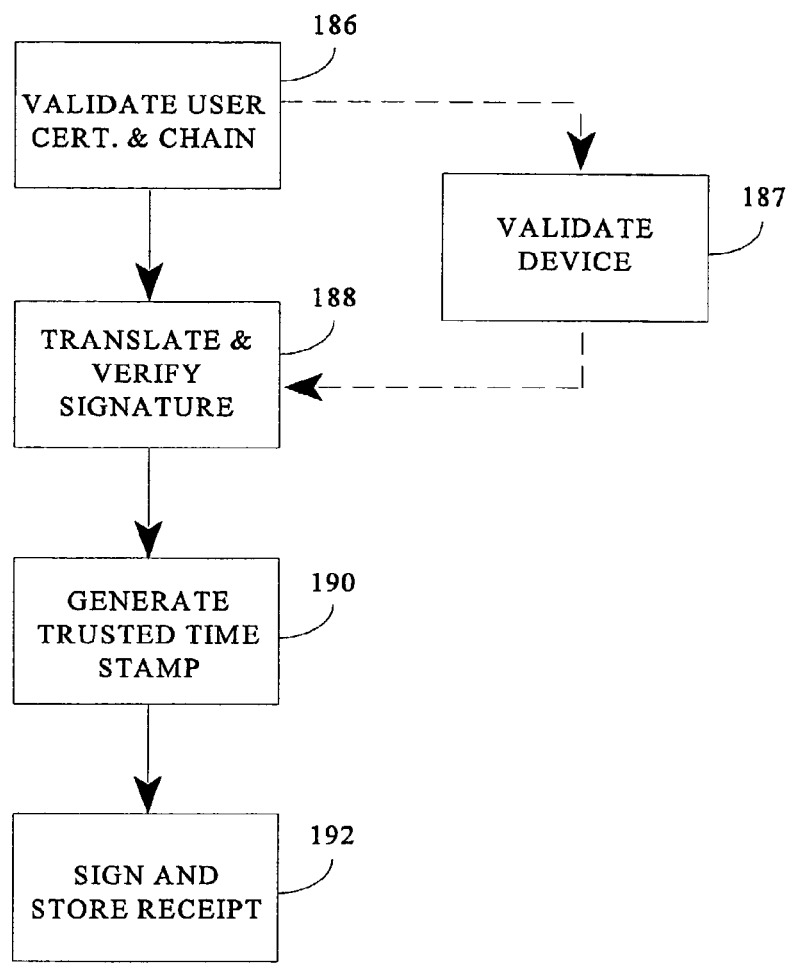
FIG. 9C is a flow diagram illustrating the steps associated with processing a validation request in accordance with an embodiment of the present invention.

The validation system illustrated in FIG. 9A is used when a user device 120, in the course of conducting commerce (e.g., over a network) transmits a signed transaction message as shown in step 164 of FIG. 9B, which is then forwarded to the VA 154 in step 166. The transaction message may optionally be transmitted to the VA 154 directly, or via a gateway device. In such a case, as shown in optional step 165, a confirmation of receipt of the signed transaction message transmitted in step 164 may be provided to the user device in step 165 by the gateway. The VA 154 then processes the validation request in step 168, the details of which are discussed in connection with FIG. 9C. After the validation process is complete in step 168, the validation results may be optionally transmitted to a gateway or other device in optional step 170.

A determination is made in step 172 as to whether or not the transaction message is valid. If it is determined in step 172 that a transaction has not been validated in step 172, a denial of service message may optionally be transmitted to a user in optional step 174, after which the process ends in step 176. If, however, it is determined in step 172 that the transaction has been validated in step 172, the validated transaction is then forwarded by the VA 154 to the application provider 158 in step 178. The application provider 158 may optionally process payment in optional step 180, using the payment processing center 162. Once the application provider 158 has received the validated transaction, the transaction is executed in step 182 by the application provider 158. Upon execution, the results are returned to the user in step 184.

The validation technique shown of step 168 in FIG. 9B is shown in greater detail in the flow diagram of FIG. 9C. In FIG. 9C, the validation request is processed by the VA 154 by first validating the user certificate and the chain of certificates associated with that user in step 186. The chain of certificates that may be validated in step 186 is discussed in greater detail in connection with FIG. 10. Optionally, the device may be validated in step 187. Then, the request is translated, and the signature verified in step 188. A trusted time stamp is then generated in step 190 and the transaction is signed and stored as an electronic receipt and the transaction receipt database 160 in step 192.

In validating the user certificate and chain of certificates associated with the user certificate in step 186, the VA 154 may query the user certificate database 125, which may also contain revocation lists to be queried. Optionally, the VA 154 may query a device database 44 to determine that a device's authorization has not been revoked. It will be recognized by those skilled in the art that external authentication agencies may be used for authenticating both user certificates, and a chain of certificates associated with a user certificate. Such resources may include, for example, organizations that publish standard revocation lists, including various agencies for monitoring certificates used in Internet commerce.

Figure 10:
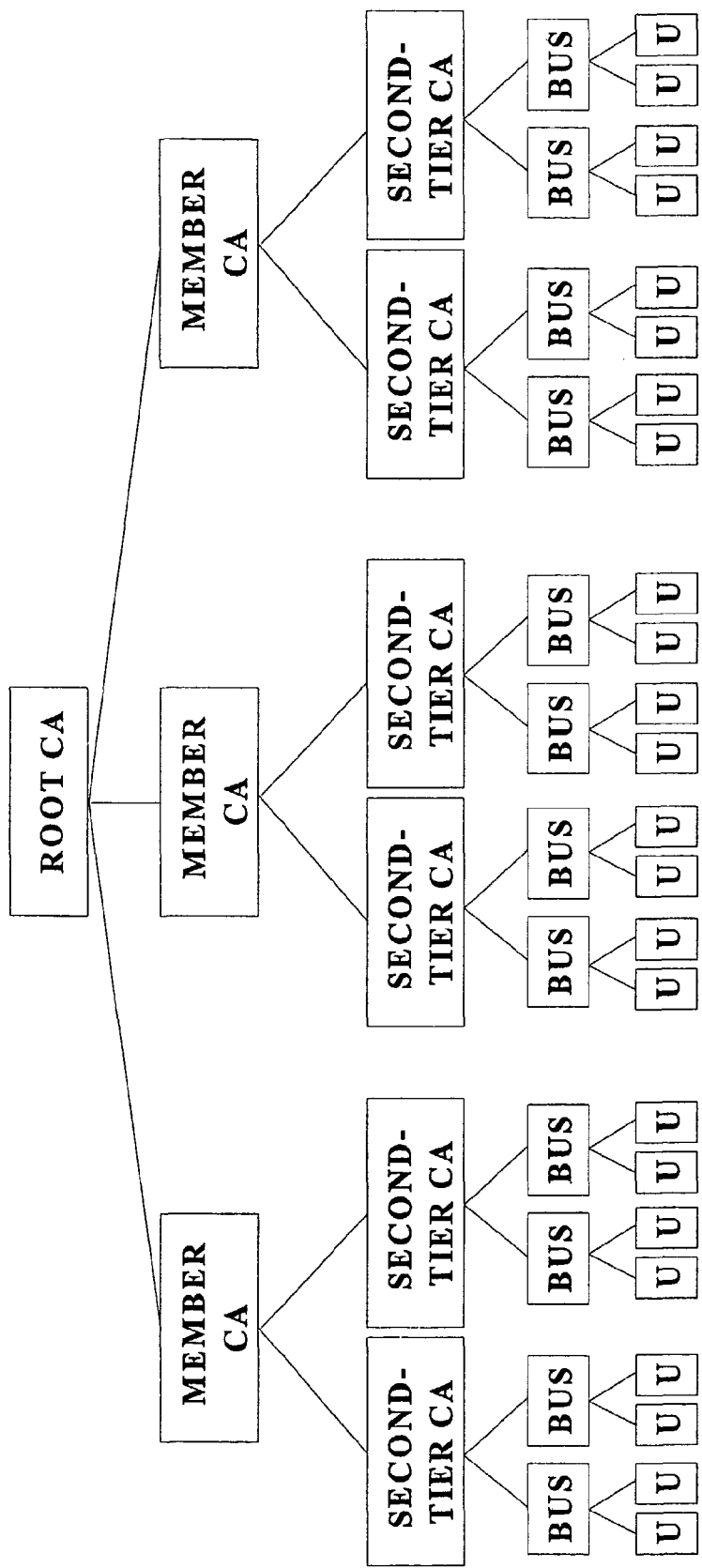
FIG. 10 is a block diagram illustrating a chain of certificate authorities used in accordance with an embodiment of the present invention.

In FIG. 10, a certificate hierarchy chain is illustrated. It is this certificate chain associated with a user chain that is validated by the VA 154 in step 186 of FIG. 9C. In FIG. 10, a Root CA is illustrated as being associated with a number of Members CAs. The Root CA is responsible for issuing certificates to Member CAs. The Member CAs issue certificates to Second-Tier CAs which issue certificates to businesses. The businesses then issue certificates to users, which may be customers, employees, and so forth. Thus, when a user certificate is validated, and the user authenticated, not only does the user certificate need to be validated, but also the entire chain extending back to the root CA from the user must also be validated.

For example, if the Root CA has its certificate revoked, then all of the certificates issued to each of the entities illustrated in FIG. 10 would be invalid. Likewise, if the certificate of a Member CA is revoked, then the certificates of the Second-Tier CAs, businesses, and corresponding users that receive certificates either directly or indirectly from the Member CA whose certificate had been revoked, would also be rendered invalid. Therefore, if a user certificate is to be validated, the issuing business that issued the certificate to the user must also have its certificate validated, along with the certificates of the Second-Tier CA, Member CA, and Root CA directly above the business in the hierarchy illustrated in FIG. 9 to ensure that the user certificate is valid and that the user's device identity can be properly authenticated. This validation generally proceeds in a top-down fashion verifying first the Root CA, followed by each entity below the Root CA to the user CA being identified.

An example of a hierarchy of the type shown in FIG. 10 is the worldwide banking system. In the worldwide banking system, which would be used in currency exchange transactions by devices having certificates issued in accordance with an embodiment of the present invention, the Root CA is the Identrus Root CA. Member CAs would include approximately seven principal banks, including such principal banks as Chase, Citibank, Deutsche Bank, and others. Approximately 30 Second-Tier CAs would fall directly under each principal bank. All of the Second-Tier CAs would have approximately 80 thousand businesses directly beneath them at the business level, each of which may have multiple users directly below them. An advantage of using a hierarchy, such as the type illustrated in FIG. 10, is that a user using a device needs only to verify a single root certificate, which in view of the limited memory and bandwidth capabilities of many devices is particularly advantageous.

Figure 11:
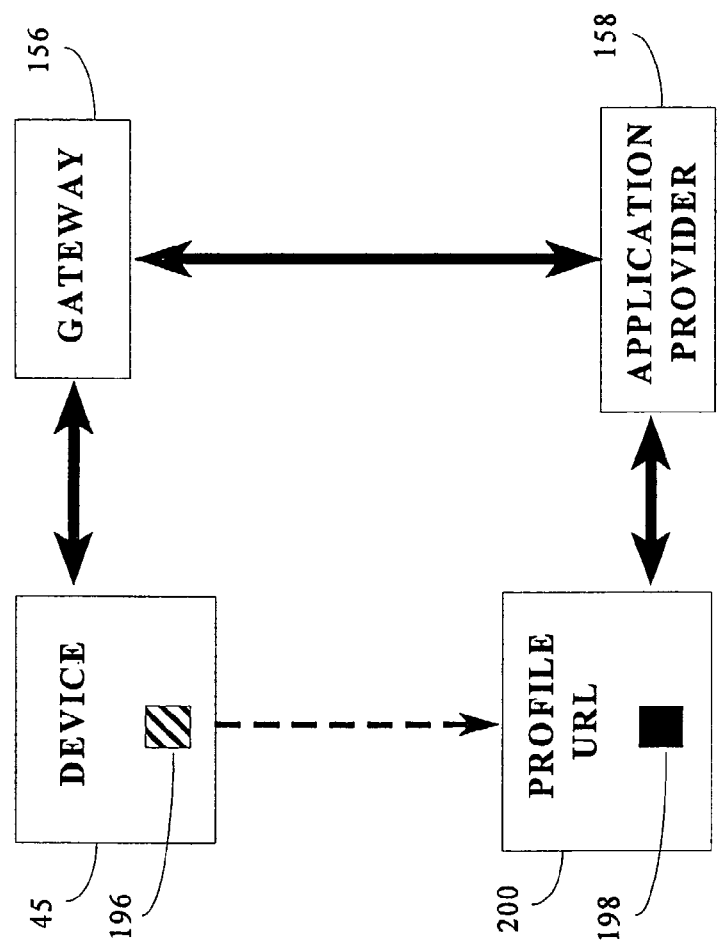
FIG. 11 is a block diagram of elements associated with using a pointer for remotely located profile/preference information in accordance with an embodiment of the present invention.

Upon validation of the device, the device may be used, and preference and/or profile information regarding the user to whom the device 45 belongs may be accessed. In such a case, as illustrated in FIG. 11, the device 45, which is shown in communication with an application provider 158 via a gateway 156, may be required by the application provider 158 to furnish some personalization and/or user profile information. Those skilled in the art will recognize that the device 45 could be made to communicate directly with the application provider 158. Traditionally, the application provider 158 requests such information in the form of a "cookie," which is a small, personalized file commonly stored in the memory of the device 45. However, due to size constraints and the memory of some devices 45, storing the crucial data contained in one or more cookie files in the memory resident on the device 45 would overburden the device 45. In addition, transferring this data over slower network connections can over burden the network by increasing bandwith requirements for each device using such cookie information.

Therefore, in accordance with an embodiment of the present invention, a pointer 196 may be provided on the user device 45 that points to a cookie 198 located at a remote location, identified by a profile URL 200. Thus, in this manner, the user using the device 45 may experience all of the benefits associated with personalization and profile information, to achieve a personalized experience from the application provider 158 as if the cookie were stored on the device 45, while minimizing the amount of memory required on the device 45 to store such information or bandwith required to transfer such information. The cookie profile information may be accessed during the startup routine of the device 45, or upon the use of the device 45 in an application requiring information stored in the cookie.

From the foregoing, it can be seen that the present invention provides a method whereby a large group of devices may be bound to a single digital certificate or notarization within an authorization infrastructure, such as the PKI system or the like. Thus, the present invention provides a manner in which the costs associated with issuing certificates for a large number of devices may be minimized, while making security measures associated with digital certificates readily accessible and essentially transparent to users, forming a part of systems to which users are accustomed that are already in place. Additionally, the present invention allows user key pairs to be securely created and or added to a device and associated with a device certificate in a manner that is readily authenticated, nonrepudiated, and in conformance with various digital signature laws around the world. Finally, the present invention provides a technique whereby user preference and profile information may be stored, and accessed by way of a user device, without the need for large amounts of memory on the device itself.

It will be appreciated by those of ordinary skill in the art that the present invention can be embodied in other specific forms without departing from the spirit or central characteristics thereof. For example, the invention has been described in the context of using smart cards in a PKI setting including SIM cards used in GSM mobile telephony systems. However, the method of the present invention may be used in any security infrastructure system that provides digital certificates for authenticating users and/or devices and validating transactions. Additionally, the present invention need not be limited to smart cards and/or SIM cards, as it can be employed in a variety of devices capable of storing key pair and digital certificate information. Moreover, it is contemplated that user preference or profiling information associated with the user certificate may be stored either within a device, as in a central location referenced by a pointer stored within the device.

The presently disclosed embodiments are, therefore, considered in all respects to be illustrative and not restricted. The scope of the invention is indicated by the appended claims, rather than the foregoing description, and all changes that come within the range and meaning and range of the equivalents thereof are intended to be embraced therein.

What is claimed is:

1. A method for deploying a trusted network capable of securely updating devices that allows for secure transactions over an open communications network, comprising the steps of:

binding a single credential to a plurality of devices to be used in secure transactions over the open communications network;

maintaining a manifest identifying each device of the plurality of devices bound to the single credential; where in the manifest lists the plurality of devices at the time of creation, is stored in an escrow database, and forms a list that is not altered;

maintaining a current list of devices approved to securely transact over the open communications network, each device being related in the current list of devices to the single credential bound to the plurality of devices to which the device belongs; and before allowing any of the plurality of devices to send a message over the open communications network, determining whether the device is authenticated to be a trusted device for transacting over the open communications network by verifying the validity of the single credential bound to the device based on the manifest and the current list.

2. The method of claim 1, further comprising the step of: using at least one of the plurality of devices to securely transact over the open communications network.

3. The method of claim 1, wherein the single credential comprises a digital certificate.

4. The method of claim 3, wherein the digital certificate is issued by a certification authority.

5. The method of claim 1, wherein the manifest is also maintained by a certification authority.

6. The method of claim 1, wherein the open communications network comprises the Internet.

7. The method of claim 1, wherein the open communications network comprises a mobile telephone network.

8. The method of claim 7, wherein the mobile telephone network comprises the global system for mobile communications (GSM).

9. The method of claim 8, wherein each of the plurality of devices comprises a subscriber identity module (SIM).

10. The method of claim 1, wherein each of the plurality of devices comprises a smart card.

11. The method of claim 1, wherein a manufacturer of the plurality of devices requests the single credential.

12. The method of claim 11, wherein the manufacturer requests the single credential from a certification authority.

13. The method of claim 1, further comprising the steps of:
storing a device key pair, comprising a device public key and a device private key within each of the plurality of devices;
generating a user key pair, comprising a user public key and a user private key, within the device;
signing the user public key using the device private key;
transmitting the signed user public key to a verification entity;
decrypting the signed user public key using a copy of the device public key retained by the verification entity.

14. The method of claim 13, wherein the step of storing further comprises:
storing a reference pointer to a device manifest within a device.

15. The method of claim 13, wherein the step of generating is performed while the device is under the control of the user with whom the user key is associated.

16. A method for effecting secure transactions via an open communications network, comprising the steps of:
binding a single credential to a plurality of devices to be used in secure transactions over the open communications network;
maintaining a manifest identifying each device of the plurality of devices bound to the single credential; wherein the manifest lists the plurality of devices at the time of creation, is stored in an escrow database, and forms a list that is not altered;
maintaining a current list of devices approved to use the single credential bound to the plurality of devices, each device being related in the current list of devices to the single credential bound to the plurality of devices to which the device belongs;
before allowing any of the plurality of devices to send a message over the open communications network, determining whether the device is authenticated to be a trusted device for transacting over the open communications network by verifying the validity of the single credential bound to the device based on the manifest and the current list; and
performing a secure transaction via one of the devices using the single credential bound to the plurality of devices to which the device belongs.

17. The method of claim 16, wherein the single credential is a digital certificate.

18. The method of claim 16, wherein the step of verifying is accomplished by way of a verification authority.

19. The method of claim 16, further comprising the step of requesting the single credential for the plurality of devices, and
wherein the step of binding is performed in response to the step of requesting.

20. The method of claim 19, wherein the step of requesting is accomplished by way of a registration authority.

21. The method of claim 20, wherein the registration authority is a manufacturer of the plurality of devices.

22. The method of claim 16, wherein the step of maintaining a current list comprises maintaining a revocation list.

23. A method of associating a credential with a plurality of devices, comprising the steps of:
a manufacturer of the plurality of devices storing data regarding the plurality of devices;
a registration authority transmitting request data to a certification authority and requesting a credential for the plurality of devices;
the certification authority recording credential data to be associated with the plurality of devices and issuing a single credential that is associated with the plurality of devices;
the certification authority providing the single credential to the manufacturer; and
the manufacturer providing each of the plurality of devices having the single credential associated therewith to a plurality of users.

24. The method of claim 23, wherein the registration authority is the manufacturer.

25. The method of claim 23, further comprising the steps of:
the manufacturer creating and storing a manifest of the single credential and each of the devices of the plurality of devices and the single credential associated with the plurality of devices.

26. A system for activation of services for a device over an open communications network, comprising:
an activation authority configured to request activation of a device, on behalf of the device;
a certification authority for certifying a credential of the device for which activation is requested by the activation authority;
a certification storage device for storing information regarding credentials for a plurality of devices;
a registration authority configured to request certification of a device from the certification authority;
a user database accessible to the registration authority and to the activation authority configured to store information regarding users associated with the plurality of devices; and
a device database accessible to the activation authority for maintaining information regarding the plurality of devices.

27. The system of claim 26, wherein the registration authority comprises a service provider.

28. A system capable of securely updating devices that allow for secure transactions over an open network, comprising:
- a manufacturer that manufactures a plurality of devices;
- an activation authority configured to request activation of each of the plurality of devices;
- a device certification authority configured to issue a credential for the plurality of devices;
- a device registration authority for requesting a credential for the plurality of devices from the device certification authority;
- a user certification authority configured to issue a credential for users of the plurality of devices;
- a user registration authority for requesting a credential for the users of the plurality of devices from the user certification authority.

29. The system of claim 28, further comprising:
- a service provider for providing service to at least one of the plurality of devices.

30. The system of claim 29, wherein the service provider is the user registration authority.

31. The system of claim 28, further comprising an escrow database accessible to the manufacturer, the device registration authority, and the device certification authority.

32. The system of claim 28, further comprising a user database accessible to the user registration authority.

33. The system of claim 28, further comprising a certificate database accessible to the user certification authority and the activation authority.

34. The system of claim 28, further comprising a device database accessible to the manufacturer and the activation authority.

35. The system of claim 28, wherein the device registration authority comprises the manufacturer.

* * * * *